US012812726B2

(12) United States Patent
Wu et al.

(10) Patent No.: US 12,812,726 B2
(45) Date of Patent: Nov. 24, 2026

(54) COMMUNICATION METHOD AND USER EQUIPMENT

(71) Applicant: SAMSUNG ELECTRONICS CO., LTD., Suwon-si (KR)

(72) Inventors: Min Wu, Beijing (CN); Sa Zhang, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 286 days.

(21) Appl. No.: 18/410,752

(22) Filed: Jan. 11, 2024

(65) Prior Publication Data

US 2024/0237135 A1 Jul. 11, 2024

(30) Foreign Application Priority Data

Jan. 11, 2023 (CN) ........................ 202310042104.8
Feb. 15, 2023 (CN) ........................ 202310171890.1

(51) Int. Cl.
*H04W 76/28* (2018.01)
*H04W 52/02* (2009.01)

(52) U.S. Cl.
CPC ....... *H04W 76/28* (2018.02); *H04W 52/0206* (2013.01); *H04W 52/0216* (2013.01)

(58) Field of Classification Search
CPC ............ H04W 36/0083; H04W 52/02; H04W 52/0206; H04W 52/0216; H04W 76/28; H04W 88/08
See application file for complete search history.

(56) References Cited

U.S. PATENT DOCUMENTS

2017/0041875 A1 2/2017 Lu et al.
2017/0111956 A1 4/2017 Koc et al.
2017/0202052 A1 7/2017 Xu et al.
2020/0037396 A1* 1/2020 Islam ................ H04W 52/0229
2020/0120746 A1 4/2020 Siomina et al.
(Continued)

OTHER PUBLICATIONS

CATT, "Remaining issues on Cell DTX/DRX," 3GPP TSG-RAN WG2 Meeting #120, R2-2211443, Toulouse, France, Nov. 14-18, 2022, Published Nov. 4, 2022, https://www.3gpp.org/ftp/ TSG_RAN/WG2_RL2/TSGR2_120/Docs, accessed on Mar. 12, 2026 (Year: 2022).*
(Continued)

*Primary Examiner* — Thomas R Cairns

(57) ABSTRACT

The disclosure relates to a 5G or 6G communication system for supporting a higher data transmission rate. Embodiments of the present disclosure provide a communication method and a user equipment. The method includes: receiving semi-static configuration information related to a cell DTX and/or a cell DRX, and/or, receiving dynamic adjustment signaling related to a cell DTX and/or a cell DRX; determining a state of the cell DTX and/or the cell DRX based on the semi-static configuration information and/or the dynamic adjustment signaling, wherein the state comprises an active time and an inactive time, i.e., in the embodiment of the embodiment of the present disclosure, using the cell DTX and/or cell DRX for the cell base station side is able to effectively reduce the power consumption of the communication base station by discontinuous transmission and/reception, and thus power saving can be achieved on the base station side.

16 Claims, 24 Drawing Sheets

(56) References Cited

U.S. PATENT DOCUMENTS

| | | | | |
|---|---|---|---|---|
| 2022/0394734 | A1 | 12/2022 | MolavianJazi et al. | |
| 2023/0020254 | A1* | 1/2023 | Ly | H04W 76/28 |
| 2024/0365232 | A1* | 10/2024 | Liu | H04W 72/0453 |
| 2025/0318011 | A1* | 10/2025 | Wang | H04W 52/0216 |
| 2026/0040213 | A1* | 2/2026 | Cheng | H04W 36/0072 |
| 2026/0040395 | A1* | 2/2026 | Myung | H04W 76/28 |

OTHER PUBLICATIONS

International Search Report and Written Opinion of the International Searching Authority dated Apr. 8, 2024, in connection with International Application No. PCT/KR2024/000452, 10 pages.

Supplementary European Search Report dated Jan. 21, 2026, in connection with European Patent Application No. 24741688.6, 8 pages.

* cited by examiner

COMMUNICATION METHOD AND USER EQUIPMENT

CROSS-REFERENCE TO RELATED APPLICATIONS

This application is based on and claims priority under 35 U.S.C. § 119 to Chinese Patent Application No. 202310042104.8 filed on Jan. 11, 2023, and Chinese Patent Application No. 202310171890.1 filed on Feb. 15, 2023, in the Chinese Intellectual Property Office, the disclosure of which is incorporated by reference herein in its entirety.

BACKGROUND

1. Field

The present disclosure relates to the technical field of wireless communication, and in particular to a communication method and a user equipment (UE).

2. Description of Related Art

In order to meet the increasing demand for wireless data communication services since the deployment of 4th generation (4G) communication systems, efforts have been made to develop improved 5G or pre-5G communication systems. Therefore, 5G or pre-5G communication systems are also called "Beyond 4G networks" or "Post-LTE systems."

In order to achieve a higher data rate, 5G communication systems are implemented in higher frequency (millimeter, mmWave) bands, e.g., 60 GHz bands. In order to reduce propagation loss of radio waves and increase a transmission distance, technologies such as beamforming, massive multiple-input multiple-output (MIMO), full-dimensional MIMO (FD-MIMO), array antenna, analog beamforming and large-scale antenna are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (COMP), reception-end interference cancellation, etc.

In 5G systems, hybrid FSK and QAM modulation (FQAM) and sliding window superposition coding (SWSC) as advanced coding modulation (ACM), and filter bank multicarrier (FBMC), non-orthogonal multiple access (NOMA) and sparse code multiple access (SCMA) as advanced access technologies have been developed.

In wireless mobile communication systems, power saving of terminal (UE) has always been an important research direction, in fact, power saving of network is also very important, mobile communication base station power consumption accounts for about 60-70% of the total power consumption of operators. How to reduce the power consumption of communication base station is an urgent technical problem to be solved.

5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

The embodiment of the present disclosure is to be able to solve the problem of how to reduce the power consumption of a communication base station.

According to an aspect of an embodiment of the present disclosure, a method performed by a UE in a communication system includes:

- receiving semi-static configuration information related to a cell DTX and/or a cell DRX, and/or, receiving dynamic adjustment signaling related to a cell DTX and/or a cell DRX;
- determining a state of the cell DTX and/or the cell DRX based on the semi-static configuration information and/or the dynamic adjustment signaling, wherein the state includes an active time and an inactive time.

Optionally, the semi-static configuration information includes at least one of the following information:

- a cycle of the cell DTX and/or the cell DRX;
- a starting position of the cycle of the cell DTX and/or the cell DRX;
- a duration of the active time in the cycle of the cell DTX and/or the cell DRX; and/or
- a duration of the inactive time in the cycle of the cell DTX and/or the cell DRX.

Optionally, the dynamic adjustment signaling includes at least one of following signaling:

- first signaling for indicating whether the active time is started at the starting position of the cycle of the cell DTX and/or the DRX, and/or adjusting the duration of the active time;
- second signaling for indicating that the cell DTX and/or DRX switches to the inactive time from the active time, or switches to the active time from the inactive time;
- third signaling for indicating that the duration of the active time is extended by a predetermined time length; and/or
- fourth signaling for indicating that the cell is in the active time.

Optionally, the method further includes at least one of:

- monitoring the first signaling during a first-time window;
- monitoring the third signaling during a second time window; and/or
- monitoring the fourth signaling during a third time window;
- wherein a starting position or ending position of the first-time window is determined based on the starting position of the cycle of the cell DTX and/or the cell DRX;
- a starting position or ending position of the second time window is determined based on an expected ending position of the active time; and/or
- the UE is configured with a DRX on the UE side, a starting position or ending position of the third time window is determined based on the starting position of the cycle of the DRX.

Optionally, the first-time window ends at a position that satisfies a first gap before the starting position of the cycle of the cell DTX and/or the cell DRX;

the second time window ends at a position that satisfies a second gap before the expected ending position of the active time; and/or the third time window ends at a position that satisfies a third gap before the starting position of the cycle of the DRX.

Optionally, if the first signaling is not detected, it is predefined or preconfigured, whether the active time is started at the starting position of the cycle of the corresponding cell DTX and/or cell DRX; and/or

- if the first signaling is detected, then whether the active time is started at the starting position of the cycle of the corresponding cell DTX and/or cell DRX is predefined or determined according to the indication of the first signaling.

Optionally, the monitoring the first signaling during a first-time window, includes monitoring the first signaling during the first-time window when the cell DTX and/or the cell DRX is in the inactive time.

Optionally, at a position of a fourth gap after receiving the second signaling, the cell is considered to switch to the inactive time from the active time or switch to the active time from the inactive time.

Optionally, the third signaling is used to extend a semi-statically configured active duration, or an active duration which is dynamically extended by third signaling previously.

Optionally, the UE is configured with a DRX on the UE side, and the method further includes monitoring the dynamic adjustment signaling, regardless of whether the DRX is in the active time or inactive time.

Optionally, the dynamic adjustment signaling is carried by at least one of the following:

- a cell common DCI;
- UE group DCI;
- a physical signal sequence; and/or
- MAC CE.

Optionally, the receiving the semi-static configuration information, includes at least one of the following means:

- receiving the semi-static configuration information via UE-specific RRC signaling; and/or
- receiving the semi-static configuration information via an SIB.

Optionally, the semi-static configuration information includes at least one of the following scenarios:

a cycle of the cell DRX is equal to a cycle of the cell DTX;

a cycle of the cell DRX is an integer multiple of a cycle of the cell DTX;

a cycle of the cell DTX is an integer multiple of a cycle of the cell DRX;

a duration of the active time in the cycle of the cell DTX is greater than or equal to a duration of the active time in the cycle of the cell DRX; and/or a duration of the active time in the cycle of the cell DRX fully or partially overlaps with a duration of the active time in the cycle of the cell DTX.

Optionally, the duration of the active time in the cycle of the cell DRX partially overlaps with the duration of the active time in the cycle of the cell DTX includes at least one of the following scenarios:

the duration of the overlapping part is greater than or equal to a first predetermined threshold value; and/or the overlapping part includes the starting position of the active time in the cycle of the cell DRX.

Optionally, the UE is configured with a DRX on the UE side, and the UE behavior includes at least one of the following:

performing the UE behavior in the active time of the DRX, if the DRX is in the active time and the cell DTX and/or the cell DRX is in the active time;

performing the UE behavior in the inactive time of the cell DTX and/or the cell DRX, if the DRX is in the active time and the cell DTX and/or the cell DRX is in the inactive time;

performing the UE behavior in the inactive time of the DRX, if the DRX is in the inactive time and the cell DTX and/or the cell DRX is in the active time; and/or performing the UE behavior in the inactive time of the cell DTX and/or the cell DRX, if the DRX is in the inactive time and the cell DTX and/or the cell DRX is in the inactive time.

Optionally, the semi-static configuration information includes at least one of the following scenarios:

a cycle of the cell DTX and/or cell DRX is equal to a cycle of the DRX;

a cycle of the DRX is an integer multiple of a cycle of the cell DTX and/or cell DRX;

a cycle of the cell DTX and/or cell DRX is an integer multiple of a cycle of the DRX;

a duration of the active time in the cycle of the cell DTX and/or cell DRX is greater than or equal to a duration of the active time in the cycle of the DRX; and/or a duration of the active time in the cycle of the cell DTX and/or cell DRX fully or partially overlaps with a duration of the active time in the cycle of the DRX.

Optionally, the method further includes at least one of:

if not configured with DCI format 2-6, starting a DRX duration timer at the starting position of the cycle of the DRX when the cell DTX and/or the cell DRX is in the active time;

if not configured with DCI format 2-6, not starting a DRX duration timer at the starting position of the cycle of the DRX when the cell DTX and/or the cell DRX is in the inactive time;

if configured with DCI format 2-6, monitoring DCI format 2-6 when the cell DTX and/or cell DRX is in the active time and determining, based on an indication of the DCI format 2-6, whether to start the DRX duration timer at the starting position of the cycle of the DRX; and/or if configured with DCI format 2-6, when the cell DTX and/or the cell DRX is in the inactive time and not monitoring DCI format 2-6, whether to start the DRX duration timer at the starting position of the cycle of the DRX is predefined or preconfigured.

Optionally, if the UE is configured to monitor DCI format 2-6, monitoring the fourth signaling during the third time window includes at least one of the following scenarios:

not monitoring the fourth signaling, monitoring DCI format 2-6 and, if DCI format 2-6 is detected, determining that the cell DTX and/or cell DRX is being in the active time;

monitoring fourth signaling and, if the fourth signaling is detected, then monitoring DCI format 2-6;

monitoring DCI format 2-6 and, if the DCI format 2-6 is detected and it indicates to start the DRX duration timer, then monitoring the fourth signaling; and/or monitoring the fourth signaling and monitoring DCI format 2-6.

Optionally, the method further includes:

starting a random-access process; and/or determining that the cell DTX and/or the cell DRX switches to the active time if the random-access process competes successfully.

Optionally, the method further includes at least one of:

determining, during a fifth time window starting at a starting position of a cycle of the cell DTX and/or the cell DRX, that the active time is started at a starting position of a cycle of the cell DTX and/or the cell DRX if DCI for scheduling a physical uplink shared channel PUSCH or a physical downlink shared channel PDSCH is detected; and/or determining, during a fifth time window starting at the starting position of the cycle of the cell DTX and/or the cell DRX, that the active time is not started at the starting position of the cycle of the cell DTX and/or the cell DRX if no DCI for scheduling the PUSCH or PDSCH is detected.

Optionally, the UE is configured with a DRX on the UE side, which further includes at least one of the following:

determining that the cell DTX and/or the cell DRX is in the active time if DCI for scheduling a PUSCH or a PDSCH is detected during a sixth time window starting at the starting position of the cycle of the DRX; and/or determining that the cell DTX and/or the cell DRX is in the inactive time if no DCI for scheduling the PUSCH or PDSCH is detected during the sixth time window starting at the starting position of the cycle of the DRX.

Optionally, the cell includes at least one of a secondary cell, a primary cell, and a primary secondary cell.

Optionally, the plurality of cells of the UE are configured with a cell DTX and/or a cell DRX, respectively; and/or the plurality of cells of the UE shares the same configuration of the cell DTX and/or cell DRX.

Optionally, the secondary cells of the UE are configured with cell DTX and/or cell DRX, and the receiving semi-static configuration information and/or dynamic adjustment signaling, including receiving semi-static configuration information and/or dynamic adjustment signaling of the secondary cell on the primary cell of the UE.

Optionally, in the inactive time of the cell DTX, the UE behavior includes at least one of the following:

not receiving a downlink signal;

not receiving at least one of the following: synchronization signal block (SSB), system information block 1 (SIB1), other system message (OSI), paging message, message2 (Msg2) during random access, message4 (Msg4) during random access, messageB (MsgB) during random access, semi-persistently scheduled physical downlink shared channel SPS-PDSCH, and SPS-PDSCH retransmission; and/or not monitoring at least one of: PDCCH on type 1 common search space, PDCCH on type 2 common search space, PDCCH on type 3 common search space, and PDCCH on a UE-specific search space.

Optionally, in the inactive time of the cell DRX, the UE behavior includes at least one of:

not transmitting an uplink signal; and/or not transmitting at least one of the following: physical random-access channel PRACH, messageA (MsgA) during random access, message3 (Msg3) during random access, Configured Grant physical uplink shared channel CG-PUSCH, and CG-PUSCH retransmission.

According to another aspect of an embodiment of the present disclosure, a method performed by a base station in a communication system includes:

transmitting semi-static configuration information related to a cell DTX and/or a cell DRX to a user equipment UE, and/or, transmitting dynamic adjustment signaling related to the cell DTX and/or the DRX to the UE, the semi-static configuration information and/or the dynamic adjustment signaling being used to indicate a state of the cell DTX and/or the cell DRX, wherein the state includes an active time or an inactive time; and/or the corresponding processing is performed based on the state.

According to a further aspect of an embodiment of the present disclosure, there is provided a user equipment, the user equipment includes:

a transceiver, configured to transmit and receive signals; and a processor, coupled to the transceiver and configured to perform the method according to an embodiment of the present disclosure to be performed by the UE.

According to a further aspect of an embodiment of the present disclosure, there is provided a base station, the base station includes:

a transceiver, configured to transmit and receive signals; and a processor, coupled to the transceiver and configured to perform the method according to an embodiment of the present disclosure to be performed by the base station.

According to a further aspect of an embodiment of the present disclosure, there is provided a computer-readable storage medium on which a computer program is stored, implementing the method performed by the UE according to an embodiment of the present disclosure when the computer program is executed by the processor.

According to a further aspect of an embodiment of the present disclosure, there is provided a computer-readable storage medium on which a computer program is stored, implementing the method performed by the base station according to an embodiment of the present disclosure when the computer program is executed by the processor.

According to a further aspect of an embodiment of the present disclosure, there is provided a computer program product including a computer program, implementing the method performed by the UE according to an embodiment of the present disclosure when the computer program is executed by the processor.

According to a further aspect of an embodiment of the present disclosure, there is provided a computer program product including a computer program, implementing the method performed by the base station according to an embodiment of the present disclosure when the computer program is executed by the processor.

There provided a communication method and user equipment according to an embodiment of the present disclosure, the communication method includes: receiving semi-static configuration information related to a cell DTX and/or a cell DRX, and/or, receiving dynamic adjustment signaling related to a cell DTX and/or a cell DRX; and determining a state of the cell DTX and/or the cell DRX based on the semi-static configuration information and/or the dynamic adjustment signaling, wherein the state includes an active time and an inactive time, i.e., in the embodiment of the present disclosure, using the cell DTX and/or the cell DRX for the cell base station side is able to effectively reduce the power consumption of the communication base station by discontinuous transmission and/or reception, and thus the power saving can be achieved on the base station side.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

In order to explain the technical solutions in the embodiments of the present disclosure more clearly, the drawings used in the description of the embodiments of the present disclosure will be briefly illustrated below.

DETAILED DESCRIPTION

Figure 1:
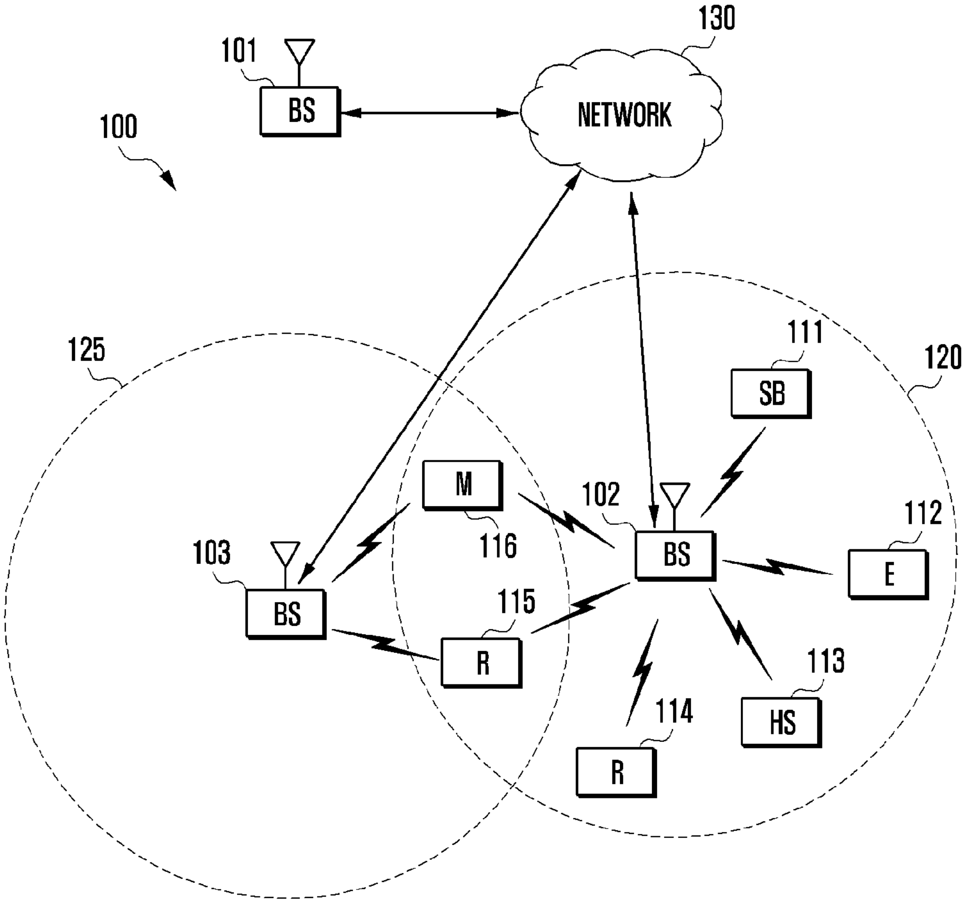
FIG. 1 illustrates an example of an overall structure of a wireless network according to an embodiment of the present disclosure.

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" refers to the existence of a corresponding disclosed function, operation or component which can be used in various embodiments of the present disclosure and does not limit one or more additional functions, operations, or components. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the present disclosure includes any or all of combinations of listed words. For example, the expression "A or B" may include A, may include B, or may include both A and B.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

To make the objects, the technical solutions and the advantages of embodiments of the present disclosure more apparent, the technical solutions of the embodiments of the present disclosure will be described in detail hereinafter in conjunction with the drawings of the embodiments of the present disclosure.

The text and drawings are provided as examples only to help readers understand the present disclosure. They are not intended and should not be understood as limiting the scope of the present disclosure in any way. Although certain embodiments and examples have been provided, on the basis of the contents disclosed by this paper, it is obvious to persons skilled in the art that the illustrated embodiments and examples can be modified without departing from the scope of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as “base station” or “access point” can be used instead of “gNodeB” or “gNB.” For convenience, the terms “gNodeB” and “gNB” are used in this patent document to refer to network infrastructure components that provide wireless access for remote terminals. And, depending on the type of the network, other well-known terms such as “mobile station,” “user station,” “remote terminal,” “wireless terminal” or “user apparatus” can be used instead of “user equipment” or “UE.” For convenience, the terms “user equipment” and “UE” are used in this patent document to refer to remote wireless devices that wirelessly access the gNB, no matter whether the UE is a mobile device (such as a mobile phone or a smart phone) or a fixed device (such as a desktop computer or a vending machine).

A gNB 102 provides wireless broadband access to the network 130 for a plurality of first User Equipments (UEs) within a coverage area 120 of the gNB 102. The plurality of first UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. A gNB 103 provides wireless broadband access to the network 130 for a plurality of second User Equipments (UEs) within a coverage area 125 of the gNB 103. The plurality of second UEs include a UE 115 and a UE 116. In some embodiments, one or more of gNBs 101-103 can communicate with each other and with UEs 111-116 using 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of the gNB 101, the gNB 102, and the gNB 103 include a 2D antenna array as described in embodiments of the present disclosure. In some embodiments, one or more of the gNB 101, the gNB 102, and the gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, the gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, the gNB 101, 102 and/or 103 can provide access to other or additional external networks, such as external telephone networks or other types of data networks.

Figure 2A:
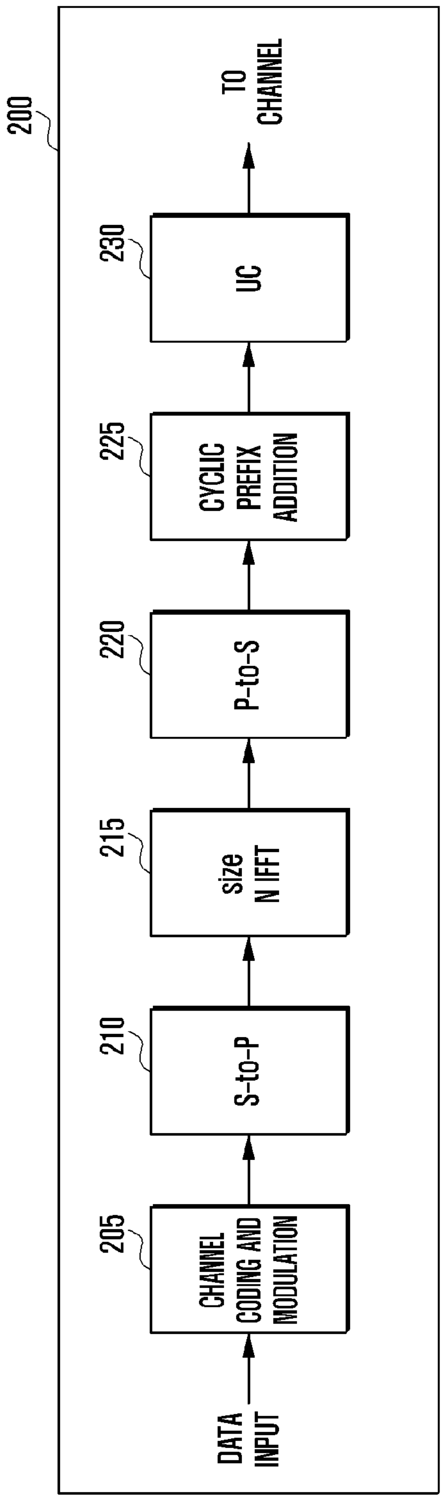
FIG. 2*a* illustrates an example of a transmission path according to an embodiment of the present disclosure.
Figure 2B:
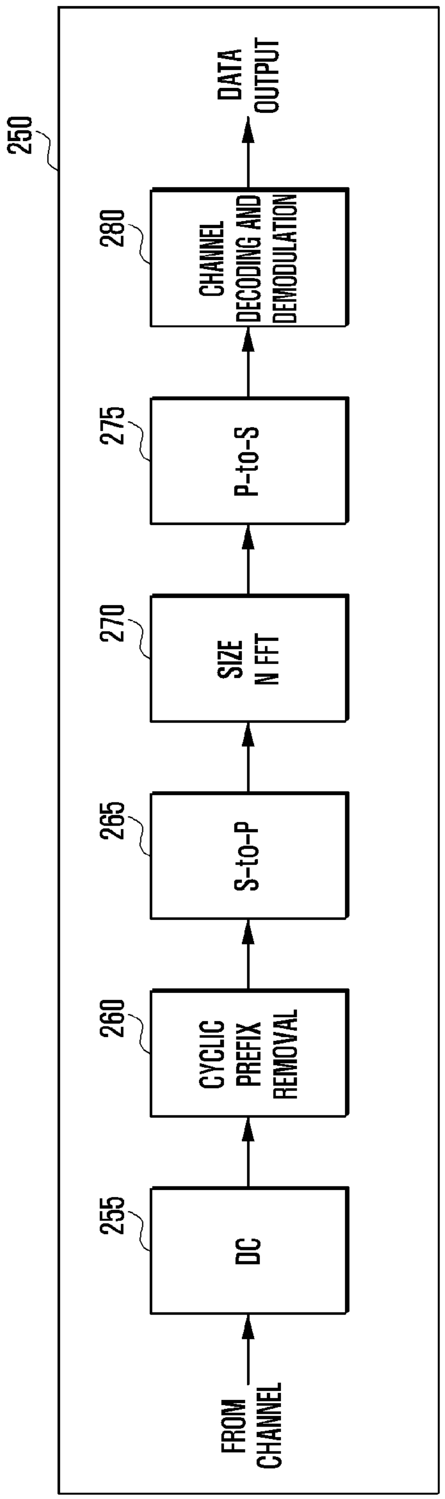
FIG. 2*b* illustrates an example of a reception path according to an embodiment of the present disclosure.

FIGS. 2*a* and 2*b* illustrate example wireless transmission and reception paths according to the present disclosure. In the following description, the transmission path 200 can be described as being implemented in a gNB, such as a gNB 102, and the reception path 250 can be described as being implemented in a UE, such as the UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the present disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in the gNB 102 and the UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from the gNB 102 arrives at the UE 116 after passing through the wireless channel, and operations in reverse to those at the gNB 102 are performed at the UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink and may implement a reception path 250 similar to that for receiving from UEs 111-116 in the uplink. Similarly, each of UEs 111-116 may implement a transmission path 200 for transmitting to the gNBs 101-103 in the uplink and may implement a reception path 250 for receiving from the gNBs 101-103 in the downlink.

Each of the components in FIGS. 2*a* and 2*b* can be implemented using only hardware or using a combination of hardware and software/firmware. As a specific example, at least some of the components in FIGS. 2*a* and 2*b* may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2*a* and 2*b* illustrate examples of wireless transmission and reception paths, various changes may be made to FIGS. 2*a* and 2*b*. For example, various components in FIGS. 2*a* and 2*b* can be combined, further subdivided or omitted, and additional components can be added according to specific requirements. Furthermore, FIGS. 2*a* and 2*b* are intended to illustrate examples of types of transmission and reception paths that can be used in a wireless network. Any other suitable architecture can be used to support wireless communication in a wireless network.

Figure 3A:
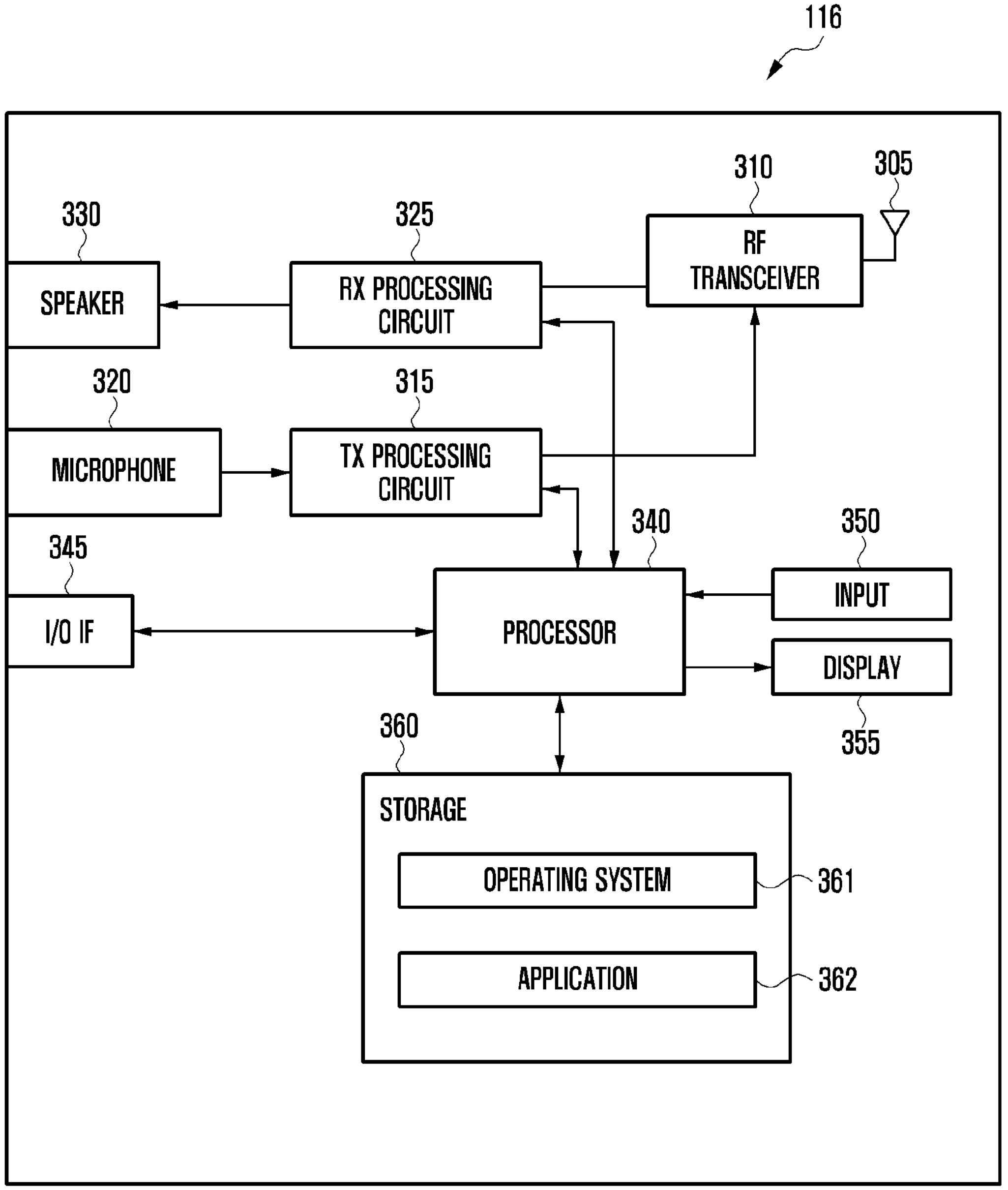
FIG. 3*a* illustrates an example of a UE according to an embodiment of the present disclosure.

FIG. 3*a* illustrates an example of the UE 116 according to the present disclosure. The embodiment of the UE 116 shown in FIG. 3*a* is for illustration only, and UEs 111-115 of FIG. 1 can have the same or similar configuration. However, a UE has various configurations, and FIG. 3*a* does not limit the scope of the present disclosure to any specific implementation of the UE.

UE 116 includes an antenna 305, a radio frequency (RF) transceiver 310, a transmission (TX) processing circuit 315, a microphone 320, and a reception (RX) processing circuit 325. The UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of the UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides the UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of the UE 116 can input data into the UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3*a* illustrates an example of the UE 116, various changes can be made to FIG. 3*a*. For example, various components in FIG. 3*a* can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3*a* illustrates that the UE 116 is configured as a mobile phone or a smart phone, the UEs can be configured to operate as other types of mobile or fixed devices.

Figure 3B:
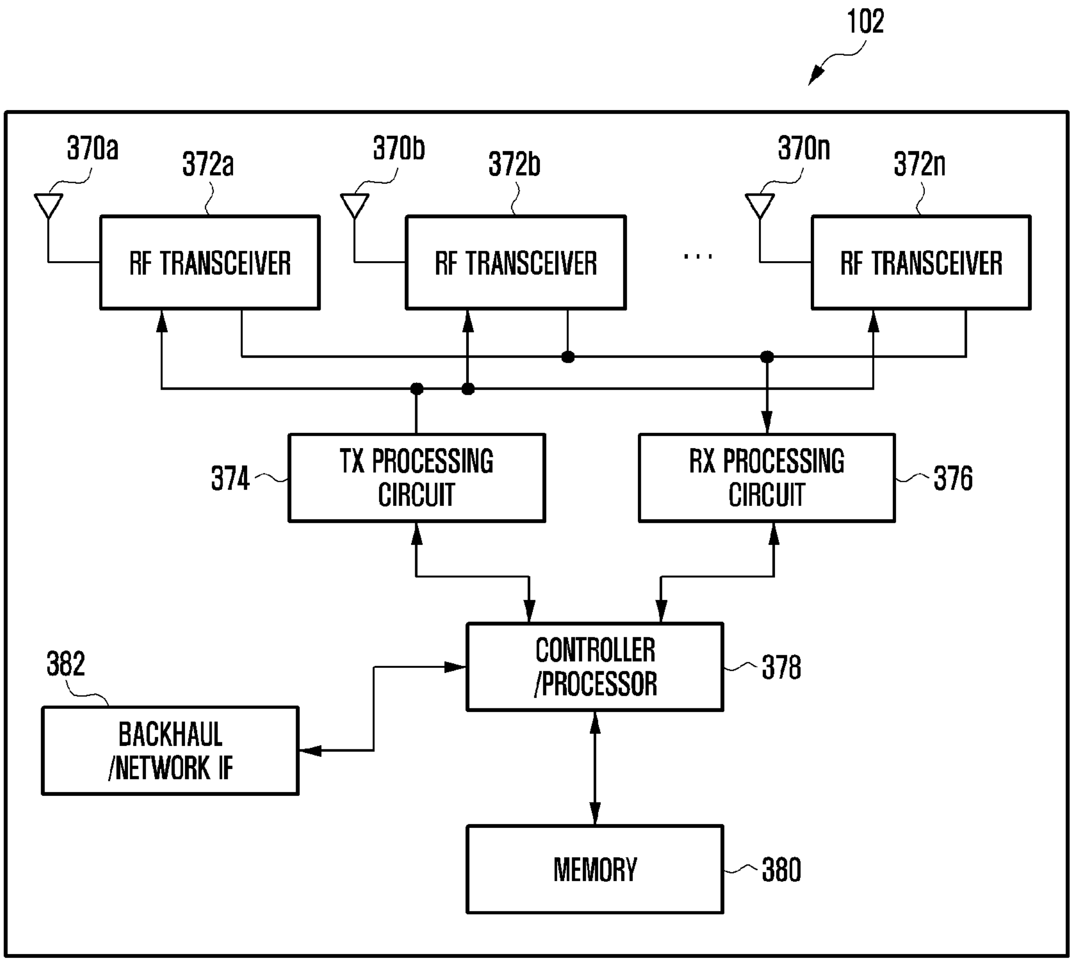
FIG. 3*b* illustrates an example of a base station according to an embodiment of the present disclosure.

FIG. 3*b* illustrates an example of the gNB 102 according to the present disclosure. The embodiment of the gNB 102 shown in FIG. 3*b* is for illustration only, and other gNBs of FIG. 1 can have the same or similar configuration. However, a gNB has various configurations, and FIG. 3*b* does not limit the scope of the present disclosure to any specific implementation of a gNB. It should be noted that a gNB 101 and a gNB 103 can include the same or similar structures as the gNB 102.

As shown in FIG. 3*b*, the gNB 102 includes a plurality of antennas 370*a*-370*n*, a plurality of RF transceivers 372*a*-372*n*, a transmission (TX) processing circuit 374, and a reception (RX) processing circuit 376. In certain embodiments, one or more of the plurality of antennas 370*a*-370*n* include a 2D antenna array. The gNB 102 also includes a controller/processor 378, a memory 380, and a backhaul or network interface 382.

RF transceivers 372*a*-372*n* receive an incoming RF signal from antennas 370*a*-370*n*, such as a signal transmitted by the UEs or other gNBs. RF transceivers 372*a*-372*n* down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372*a*-372*n* receive the outgoing processed baseband or IF signal from TX processing circuit 374 and up-convert the baseband or IF signal into an RF signal transmitted via antennas 370*a*-370*n*.

The controller/processor 378 can include one or more processors or other processing devices that control the overall operation of the gNB 102. For example, the controller/processor 378 can control the reception of forward channel signals and the transmission of backward channel signals through the RF transceivers 372*a*-372*n*, the RX processing circuit 376 and the TX processing circuit 374 according to well-known principles. The controller/processor 378 can also support additional functions, such as higher-level wireless communication functions. For example, the controller/processor 378 can perform a blind interference sensing (BIS) process such as that performed through a BIS algorithm and decode a received signal from which an interference signal is subtracted. A controller/processor 378 may support any of a variety of other functions in the gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows the gNB 102 to communicate with other devices or systems through a backhaul connection or through a network. The backhaul or network interface 382 can support communication over any suitable wired or wireless connection(s). For example, when the gNB 102 is implemented as a part of a cellular communication system, such as a cellular communication system supporting 5G or new radio access technology or NR, LTE or LTE-A, the backhaul or network interface 382 can allow the gNB 102 to communicate with other gNBs through wired or wireless backhaul connections. When gNB 102 is implemented as an access point, the backhaul or network interface 382 can allow the gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions is configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372*a*-372*n*, TX processing circuit 374 and/or RX processing circuit 376) support aggregated communication with FDD cells and TDD cells.

Although FIG. 3*b* illustrates an example of gNB 102, various changes may be made to FIG. 3*b*. For example, the gNB 102 can include any number of each component shown in FIG. 3*a*. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, the gNB 102 can include multiple instances of each (such as one for each RF transceiver).

The embodiment of the present disclosure provides a network power saving method, giving the relevant method for power saving of base stations from the perspective of Discontinuous Transmission and Discontinuous Reception on the base station side. Reducing the power consumption of a communication base station is of great importance for a communication operator to achieve the goal of power saving and emission reduction. The reduction of power consumption of a base station reduces the amount of heat generated by the equipment and correspondingly the power consumption of the air conditioner is also reduced, thus reducing the operator's electricity expenses.

The technical solutions of the embodiment of the present disclosure and the technical effects resulting from the technical solutions of the present disclosure are described below by means of a description of several exemplary embodiments. It should be noted that the following embodiments can be cross-referenced, borrowed or combined with each other, and the description of the same terms, similar features and similar implementation steps etc. in the different embodiments will not be repeated.

Figure 4:
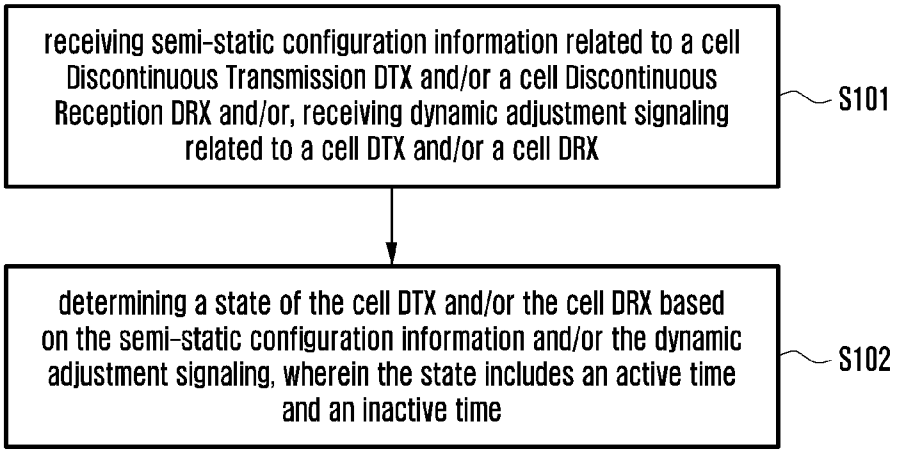
FIG. 4 illustrates an example of a flowchart of a method performed by a UE according to an embodiment of the present disclosure.

A method performed by a UE in a communication system is provided according to an embodiment of the present disclosure, as shown in FIG. 4, the method including:

step S101: receiving semi-static configuration information related to a cell DTX (Discontinuous Transmission) and/or a cell DRX (Discontinuous Reception), and/or, receiving dynamic adjustment signaling related to a cell DTX and/or a cell DRX; and/or Step S102: determining a state of the cell DTX and/or the cell DRX based on the semi-static configuration information and/or the dynamic adjustment signaling, wherein the state includes an active time and an inactive time.

In the embodiment of the present disclosure, cell DTX means that the cell saves power by Discontinuous Transmission, and cell DRX means that the cell saves power by Discontinuous Reception. A similar concept can be referred to one of the most important terminal power saving techniques in 4G and 5G systems_the terminal (UE) DRX technique, where the terminal achieves power saving by Discontinuous Reception.

For the embodiment of the present disclosure, the active time of the cell DTX can also be referred to as the ON, active time, non-power saving state, or active duration of the cell; the inactive time of the cell DTX can also be referred to as the OFF, inactive time, sleep period, dormant period, power saving state, or inactive duration of the cell.

In the embodiment of the present disclosure, in the inactive time of the cell DTX, the UE behavior includes at least one of the following:

(1) not receiving a downlink signal;

(2) not receiving at least one of the following: synchronization signal block (SSB), system information block 1 (SIB1), other system information (OSI), i.e., other system messages other than SIB1, that is, SIB2 to SIBn), paging message (paging), message 2 (Msg2) during random access, Msg4 random access, MsgB during random access, semi-persistent scheduling physical downlink shared channel (SPS-PDSCH), and SPS-PDSCH retransmission; and/or (3) not monitoring at least one of physical downlink control channel (PDCCH) on type 1 common search space, PDCCH on type 2 common search space, PDCCH on type 3 common search space, and PDCCH on the UE-specific search space.

It is to be noted that the signal in the embodiment of the present disclosure may refer to a signal in a communication system or may refer to any information in a broad sense that needs to be transmitted by two or more parties in a communication system in accordance with a provision, and may include, for example, a signal, a channel, etc. in a communication system. That is, a signal in the present disclosure may refer to a signal, or a channel, or may include both a signal and a channel. Similarly, a downlink signal may also refer to a downlink signal and/or channel, and an uplink signal may also refer to an uplink signal and/or channel. In the following, for ease of description, the signal and/or channel may be referred to as the signal/channel, i.e., "/" and "and/or" may be interchangeable, i.e., the signal/channel may also include the signal, may include the channel, or may include both the signal and the channel.

In other words, during the cell DTX active duration, the cell can normally transmit the downlink signal/channel, and, correspondingly, the UE can normally receive the downlink signal/channel. During the cell DTX inactive duration, the transmission behavior of the cell and the reception behavior of the UE may be any of the following restricted behaviors:

(1) the cell does not transmit any downlink signal/channel, and correspondingly the UE does not receive any downlink signal/channel;

(2) the cell does not transmit any downlink signal/channel other than SSB and, correspondingly, the UE does not receive any downlink signal/channel other than SSB;

(3) the cell does not transmit any downlink signal/channel other than SSB, SIB1, OSI, and correspondingly, the UE does not receive any other downlink signal/channel other than SSB, SIB1, OSI;

(4) The cell does not transmit any downlink signal/channel other than SSB, SIB1, OSI, paging, and correspondingly, the UE does not receive any other downlink signal/channel other than SSB, SIB1, OSI, paging;

(5) the cell does not transmit any downlink signal/channel other than SSB, SIB1, OSI, paging, Msg2, Msg4, MsgB, and correspondingly, the UE does not receive any other downlink signal/channel other than SSB, SIB1, OSI, paging, Msg2, Msg4, MsgB, e.g., the UE does not monitor PDCCH and does not receive the SPS-PDSCH. In other words, the UE's SPS-PDSCH resources are released when the cell switches to the DTX inactive duration from the DTX active duration. Optionally, the UE not monitoring PDCCHs means that the UE does not monitor PDCCHs on Type 3 common search space (Type 3 CSS) and a UE-specific search space (USS), or the UE not monitoring PDCCHs means that the UE does not monitor the PDCCHs on all search spaces; and/or (6) The cell does not transmit any downlink signal/channel other than SSB, SIB1, OSI, paging, Msg2, Msg4, MsgB, SPS-PDSCH and their retransmissions, correspondingly, the UE does not receive any other downlink signal/channel other than SSB, SIB1, OSI, paging, Msg2, Msg4, MsgB, SPS-PDSCH and their retransmissions, e.g., the UE does not monitor the PDCCH. Here, the UE not monitoring the PDCCH means that the UE does not monitor the PDCCHs on Type 3 CSS and USS, or the UE not monitoring the PDCCH means that the UE does not monitor the PDCCHs on all search spaces.

For the embodiment of the present disclosure, the active time of the cell DRX may also be referred to as the ON, active time, or non-power saving state, or active duration of the cell, and the inactive time of the cell DRX may also be referred to as the OFF, inactive time, sleep period, dormant period, power saving state, or inactive duration of the cell.

In the embodiment of the present disclosure, in the inactive time of the cell DRX, the UE behavior includes at least one of the following:

(1) not transmitting an uplink signal; and/or (2) not transmitting at least one of the following: physical random-access channel (PRACH), message A (MsgA) during random access, Msg3, configured grant physical uplink shared channel (CG-PUSCH), and CG-PUSCH retransmission.

In other words, during the cell DRX active duration, the cell may normally receive uplink signals/channels, and correspondingly, the UE may transmit uplink signals/channels normally. During the cell DRX inactive duration, the reception behavior of the cell and the transmission behavior of the UE may be any one of the following restricted behaviors:

(1) the cell does not receive any uplink signal/channel, and correspondingly the UE does not transmit any uplink signal/channel;

(2) the cell does not receive any uplink signal/channel other than PRACH, MsgB, Msg3 and, correspondingly, the UE does not transmit any other uplink signal/channel other than PRACH, MsgB, Msg3; and/or (3) the cell does not receive any uplink signal/channel other than PRACH, MsgB, Msg3, CG-PUSCH and their retransmission, correspondingly, the UE does not transmit any other uplink signal/channel other than PRACH, MsgB, Msg3, CG-PUSCH and their retransmission; optionally, the cell switches to the inactive duration from the DRX active duration and the CG-PUSCH resource remains available. Where CG-PUSCH means type 1 CG-PUSCH and/or CG-PUSCH.

In the embodiment of the present disclosure, the cell DTX and cell DRX may refer to independently configured cell DTX and cell DRX, i.e., the cell DRX and cell DTX may be configured independently. In other words, the cycle of the cell DTX and the cycle of the cell DRX may be configured separately, the starting position of the cycle of the cell DTX and the starting position of the cycle of the cell DRX may be configured separately, and the duration of the active time in the cycle of the cell DTX and the duration of the active time in the cycle of the cell DRX can be configured separately. During the cell DTX inactive duration, the cell transmission behavior and the UE reception behavior are restricted, and during the cell DRX inactive duration, the cell reception behavior and the UE transmission behavior are restricted.

Then, in step S101, semi-static configuration information and/or dynamic adjustment signaling related to the cell DTX is received, and in step S102, the state of the cell DTX, i.e., the active time of the cell DTX or the inactive time of the cell DTX, is determined based on the semi-static configuration information and/or the dynamic adjustment signaling.

Alternatively, in step S101, the semi-static configuration information and/or dynamic adjustment signaling related to the cell DRX is received and, in step S102, the state of the cell DRX, i.e., the active time of the cell DRX or the inactive time of the cell DRX, is determined based on the semi-static configuration information and/or the dynamic adjustment signaling.

Alternatively, in step S101, the semi-static configuration information and/or dynamic adjustment signaling related to the cell DTX, and the semi-static configuration information and/or dynamic adjustment signaling related to the cell DRX are received, respectively, and in step S102, based on the semi-static configuration information and/or dynamic adjustment signaling related to the cell DTX, and the semi-static configuration information and/or dynamic adjustment signaling related to the cell DRX, determining the states of the cell DTX and the cell DRX, i.e., the active time of the cell DTX or the inactive time of the cell DTX, and the active time of the cell DRX or the inactive time of the cell DRX, respectively.

Then, if the cell DTX is in the active time and the cell DRX is in the active time, there is no restriction on the cell transmission/reception behavior and the UE reception/transmission behavior. If the cell DTX is in the active time and the cell DRX is in the inactive time, the cell reception behavior, and the UE transmission behavior are restricted, which may be either of the restricted behaviors of the inactive time of the cell DRX described in the previous section. If the cell DTX is in the inactive time and the cell DRX is in the active time, the cell transmission behavior, and the UE reception behavior are restricted, which may be either of the restricted behaviors of the inactive time of the cell DRX described in the previous section. If the cell DTX is in the inactive time and the cell DRX is in the inactive time, the cell transmission and reception behavior and the UE reception and transmission behavior are restricted, which may be any combination of the restricted behavior of the inactive time of the cell DTX and the restricted behavior of the inactive time of the cell DTX as described previously.

In the embodiment of the present disclosure, the cell DTX and cell DRX may also refer to a combined configured cell DTX and cell DRX, i.e., the cell DRX and cell DTX may be combined into one configuration. In other words, the cycle of the cell DTX and the cycle of the cell DRX are identical, the starting position in the cycle of the cell DTX is identical to the starting position in the cycle of the cell DRX, the duration of the active time in the cycle of the cell DTX is exactly the same as the duration of the active time in the cycle of the cell DRX. During the cell DTX inactive duration and the cell DRX, the cell reception and transmission behavior, as well as the UE transmission and reception behavior, are all restricted, and the specific restricted behavior may be a combination of the restricted behavior of the inactive time of the cell DTX and the restricted behavior of the inactive time of the cell DRX as described in the previous section. In this configuration, the cell's transmission and reception are restricted simultaneously, and correspondingly, the UE's transmission and reception are restricted simultaneously.

Then, in step S101, the semi-static configuration information and/or dynamic adjustment signaling related to the cell DTX and the cell DRX is received, and in step S102, the state of the cell DTX and the cell DRX, i.e., the active time of the cell DTX and the cell DRX, or the inactive time of the cell DTX and the cell DRX, is determined based on the semi-static configuration information and/or the dynamic adjustment signaling.

For the embodiment of the present disclosure, the active time of the combined configured cell DTX and cell DRX may also be referred to as the ON, active time, or non-power saving state, or active duration of the cell, and the inactive time of the combined configured cell DTX and cell DRX may also be referred to as the OFF, inactive time, sleep period, dormant period, or power saving state, or inactive duration of the cell.

It should be noted that in the following, for ease of description, the cell DTX and/or the cell DRX may be referred to simply as the cell DTX/DRX, i.e., "/" and "and/or" may be interchangeable, i.e., the cell DTX/DRX may also include the independently configured cell DTX, may include an independently configured cell DRX, may include both independently configured cell DTX and cell DRX respectively, or may include a combined configured cell DTX and cell DRX.

By way of example, the active time of the cell DTX and/or the cell DRX may be referred to hereinafter for ease of description as the active time of the cell DTX/DRX, i.e., it may refer to the active time of the cell DTX, it may refer to the active time of the cell DRX, it may refer to the active time of the cell DTX and the active time of the cell DRX, or it may refer to the active time of the combined configured cell DTX and cell DRX. Similarly, it may be possible to refer to the inactive time of the cell DTX and/or the cell DRX simply as the inactive time of the cell DTX/DRX, i.e., it may refer to the inactive time of the cell DTX, it may refer to the inactive time of the cell DRX, it may refer to the inactive time of the cell DTX and the inactive time of the cell DRX, or it may refer to the inactive time of the combined configured cell DTX and cell DRX.

In addition, in some embodiments of the present disclosure, the base station and the cells it serves have a one-to-one correspondence, so that the cell DTX may also be understood as the base station DTX and the cell DRX may also be understood as the base station DRX.

In the embodiment of the present disclosure, for the base station, the power consumed by the downlink transmission is the bulk of the power consumption of the base station, and the uplink reception may also have a certain power consumption. Using the cell DTX and/or the cell DRX for the cell base station side can effectively reduce the power consumption of the communication base station, and thus can achieve the purpose of power saving on the base station side.

Figure 5:
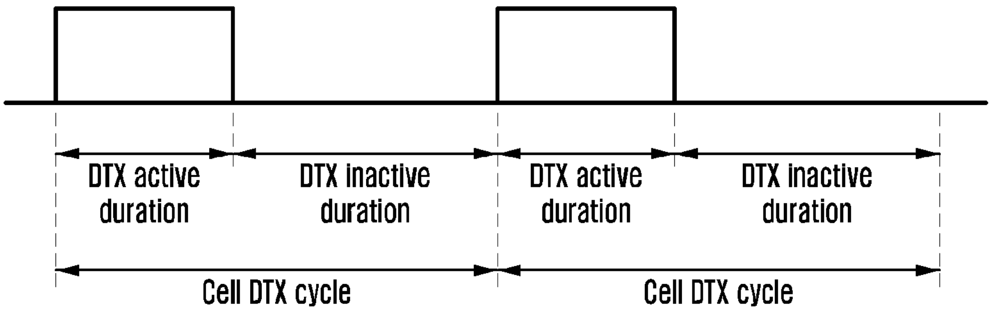
FIG. 5 illustrates an example of a cell DTX configuration according to an embodiment of the present disclosure.

Optionally, as shown in FIG. 5, the cell DTX has periodicity. Each cell DTX cycle includes a duration of the active time of the cell DTX and another duration of the inactive time of the cell DTX. Optionally, the active time of the cell DTX is at the front of the cell DTX cycle, the inactive time of the cell DTX is at the back of the cell DTX cycle, and the duration of the active time of the cell DTX and the duration of the inactive time of the cell DTX together constitute the size of the cell DTX cycle.

Figure 6:
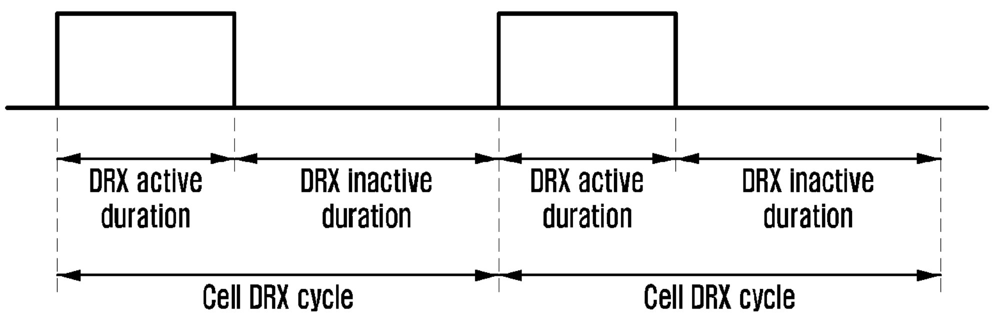
FIG. 6 illustrates an example of a cell DRX configuration according to an embodiment of the present disclosure.

Similarly, optionally, as shown in FIG. 6, the cell DRX state has periodicity, each cell DRX cycle including a duration of the active time of the cell DRX and another duration of the inactive time of the cell DRX, the active time of the cell DRX is at the front of the cell DRX cycle and the inactive time of the cell DRX is at the back of the cell DRX cycle, the duration of the active time of the cell DRX and the duration of the inactive time of the cell DRX together constitute the size of the cell DRX cycle.

Figure 7:
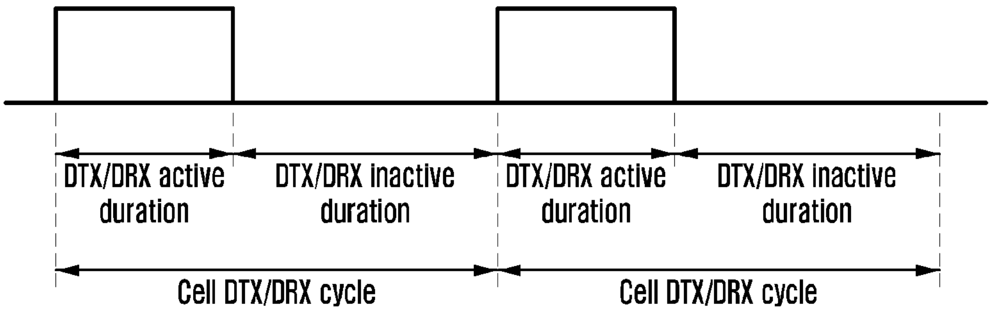
FIG. 7 illustrates an example of a cell DTX/DRX configuration according to an embodiment of the present disclosure.

For implementations where the cell DRX and cell DTX are combined into one configuration, as shown in FIG. 7, the state of the cell DTX/DRX has periodicity, each cell DTX/DRX cycle including a duration of the active time of the cell DTX/DRX and another duration of the inactive time of the cell DTX/DRX, the active time of the cell DTX/DRX is at the front of cell DTX/DRX cycle, and the inactive time of the cell DTX/DRX is at the back of the cell DTX/DRX cycle, the duration of the active time of the cell DTX/DRX and the duration of the inactive time of the cell DTX/DRX together constitute the size of the cell DTX/DRX cycle.

In the embodiment of the present disclosure, the above semi-static configuration information includes at least one of the following information:

a cycle of the cell DTX and/or the cell DRX;

a starting position of the cycle of the cell DTX and/or the cell DRX;

a duration of the active time in the cycle of the cell DTX and/or the cell DRX; and/or a duration of the inactive time in the cycle of the cell DTX and/or the cell DRX.

For example, the size of the DTX cycle, the starting position of the DTX cycle may be configured semi-statically by high level signaling. Alternatively, the size of the DRX cycle and the starting position of the DRX cycle may be configured semi-statically by high level signaling. Alternatively, the size of the cycle of the combined configured cell DTX and cell DRX, and the starting position of the cycle of the cell DTX and cell DRX may be configured semi-statically by high level signaling.

In particular, receiving the above semi-static configuration information includes at least one of the following ways:

receiving the above semi-static configuration information by RRC (Radio Resource Control) signaling specific to the UE; and/or receiving the above semi-static configuration information via the SIB (System Information Block).

Taking the semi-static configuration information of the cell DTX (which may be referred to as configuration information in the following for ease of description) as an example (the semi-static configuration information of the cell DRX and the semi-static configuration information of the combined cell DTX and cell DRX, and so on, may not be repeated), the configuration information of the cell DTX can be broadcast in the system information block to all UEs in the cell, the UEs in the RRC idle state and the RRC inactive time can also obtain the configuration information of the cell DTX, the configuration information of the cell DTX includes the size of the DTX cycle, the starting position of the DTX cycle, and the duration of the DTX active duration in the DTX cycle. During the DTX active duration, the behavior of the UEs in the RRC idle state and the RRC inactive time is not different from the existing system. During the DTX inactive duration, the behavior of the UEs in the RRC idle state and the RRC inactive time may be any of the following:

(1) the cell does not transmit the SSB, Paging, correspondingly the UEs in the RRC idle state and the RRC inactive time do not monitor paging messages and do not need to perform radio resource management (RRM) measurements; and/or (2) the cell does not transmit Paging, but still transmits SSBs, correspondingly, the UEs in the RRC idle state and the RRC inactive time can receive SSBs to perform RRM measurements, but do not need to monitor paging messages.

In the embodiment of the present disclosure, if the cell DRX and the cell DTX are configured independently, the above semi-static configuration information (i.e., the semi-static configuration information related to the cell DTX and the semi-static configuration information related to the cell DRX) satisfies at least one of the following scenarios:

(1) the cycle of the cell DRX is equal to the cycle of the cell DTX;

(2) the cycle of the cell DRX is an integer multiple of the cycle of the cell DTX, i.e., the cycle of the cell DRX may be N1 times the cycle of the cell DTX, where N1 is a positive integer;

(3) the cycle of the cell DTX is an integer multiple of the cycle of the cell DRX, i.e., the cell DTX cycle may be N2 times the cell DRX cycle, where N2 is a positive integer;

(4) the duration of the active time in the cycle of the cell DTX is greater than or equal to the duration of the active time in the cycle of the cell DRX, i.e., the duration length of the cell DTX active duration in a semi-static configuration may be greater than or equal to the duration length of the cell DRX active duration in a semi-static configuration; and/or (5) the duration of the active time in the cycle of the cell DRX fully or partially overlaps with the duration of the active time in the cycle of the cell DTX, i.e., the semi-statically configured cell DRX active duration may fully overlap with the semi-statically configured cell DTX active duration, i.e., the cell DRX active duration is fully in the cell DTX active duration; or, the semi-statically configured cell DRX active duration may at least partially overlap with the semi-statically configured cell DTX active duration, i.e., the cell DRX active duration may be at least partially in the cell DTX active duration.

In the embodiment of the present disclosure, the partial overlap of the duration of the active time in the cycle of the cell DRX with the duration of the active time in the cycle of the cell DTX includes at least one of the following scenarios:

1) the duration of the overlapping part is greater than or equal to a first predetermined threshold value; and/or 2) the overlapping part includes the starting position of the active time in the cycle of the cell DRX, i.e., the starting position of the cell DRX active duration may be in the cell DTX active duration.

The advantage of satisfying at least one of the above conditions for the semi-static configuration information related to the cell DTX and the semi-static configuration information related to the cell DRX in the embodiment of the present disclosure is that the cell DRX configuration and the cell DTX configuration can be aligned, thereby simplifying the cell and UE behaviors.

In the embodiment of the present disclosure, an RRC connected-state UE may be configured with both a DRX (i.e., DRX on the UE side, which may be referred to hereafter as UE DRX for ease of differentiation) as well as a cell DTX/DRX, and if the UE DRX is in the active time and the cell DTX and/or cell DRX is in the active time, the UE performs the UE behavior in the active time of the UE DRX, i.e., when the UE is in the DRX active time and the cell DTX/DRX is in the active time, the UE behavior is the same as the UE behavior in the DRX active time of the existing system and there is no difference; if the UE DRX is in the inactive time and the cell DTX and/or cell DRX is in the active time, the UE performs the UE behavior in the inactive time of the UE DRX, i.e., when the UE is in the DRX inactive time and the cell DTX/DRX is in the active time, the UE behavior is the same as the UE behavior in the DRX inactive time of the existing system and there is no difference; if the UE DRX is in the active time and the cell DTX and/or cell DRX is in the inactive time, the UE performs the UE behavior in the inactive time of the cell DTX and/or cell DRX; if the UE DRX is in the inactive time, the cell DTX and/or cell DRX is in the inactive time, the UE performs the UE behaviors in the inactive time of the cell DTX and/or cell DRX, i.e., when the UE is in the DRX active or inactive time and the cell DTX/DRX is in the inactive time, the UE behavior is any one of the restricted behaviors described previously. In addition, the above static configuration information (i.e., cell DTX and/or cell DRX related semi-static configuration information with UE DRX related semi-static configuration) information satisfies at least one of the following scenarios:

(1) a cycle of the cell DTX and/or cell DRX is equal to a cycle of the UE DRX;

(2) a cycle of the UE DRX is an integer multiple of the cycle of the cell DTX and/or cell DRX, i.e., the UE DRX cycle may be N3 times the cell DTX/DRX cycle, where N3 is a positive integer;

(3) a cycle of the cell DTX and/or cell DRX is an integer multiple of a cycle of the UE DRX, i.e., the cell DTX/DRX cycle may be N4 times the UE DRX cycle, where N4 is a positive integer;

(4) a duration of the active time in the cycle of the cell DTX and/or the cell DRX is greater than or equal to a duration of the active time in the cycle of the UE DRX, i.e., the duration length of the cell DTX/DRX active duration in a semi-static configuration may be greater than or equal to the duration length of the UE DRX active duration in a semi-static configuration; and/or (5) a duration of the active time in the cycle of the cell DTX and/or the cell DRX fully or partially overlaps with a duration of the active time in the cycle of the UE DRX, i.e., the semi-statically configured UE DRX active duration may fully overlap with the semi-statically configured cell DTX/DRX active duration, i.e., the UE DRX active duration is fully in the cell DTX/DRX active duration; or, the semi-statically configured UE DRX active duration may at least partially overlap with the semi-statically configured cell DTX/DRX active duration, i.e., the UE DRX active duration is at least partially in the cell DTX/DRX active duration.

In the embodiment of the present disclosure, the partial overlap of the duration of the active time in the cycle of the cell DTX and/or the cell DRX with the duration of the active time in the cycle of the UE DRX includes at least one of the following scenarios:

1) the duration of the overlapping part is greater than or equal to a second predetermined threshold value; and/or 2) the overlapping part includes the starting position of the UE DRX active time, i.e., the starting position of the cell DRX active duration may be in the cell DTX active duration.

For the embodiment of the present disclosure, the advantage of the semi-static configuration information related to the cell DTX and/or cell DRX and the semi-static configuration information related to the UE DRX satisfying the above conditions is that the UE DRX configuration and the cell DTX/DRX configuration can be aligned, thereby simplifying the cell and UE behavior.

In the embodiment of the present disclosure, if the UE is configured with a DRX on the UE side and the UE is not configured to monitor DCI (Downlink Control Information) format 2-6, including at least one of the following scenarios:

(1) starting a DRX duration timer (drx-onDurationTimer) at the starting position of the cycle of the UE DRX, regardless of whether the cell DTX and/or the cell DRX is in the active time;

(2) when the cell DTX and/or the cell DRX is in the active time, starting a DRX duration timer at the starting position of the cycle of the DRX; and/or (3) when the cell DTX and/or the cell DRX is in the inactive time, not starting a DRX duration timer at the starting position of the cycle of the DRX.

In the embodiment of the present disclosure, if the UE is configured with a DRX on the UE side and the UE is configured with DCI format 2-6, including at least one of the following scenarios:

(1) monitoring DCI format 2-6 regardless of whether the cell DTX and/or cell DRX is in the active time, and determining whether to start the DRX duration timer at the starting position of the UE DRX cycle based on the monitoring result of DCI format 2-6;

(2) monitoring DCI format 2-6 when the cell DTX and/or cell DRX is in the active time and determining, based on the indication of DCI format 2-6, whether to start the DRX duration timer at the starting position of the cycle of the DRX; and/or (3) when the cell DTX and/or the cell DRX is in the inactive time, not monitoring DCI format 2-6, whether to start the DRX duration timer at the starting position of the cycle of the DRX is predefined or preconfigured.

That is, if the cell DTX and/or the cell DRX is in the inactive time, the UE does not need to monitor DCI format 2-6, the UE starts the DRX duration timer at the starting position of the cycle of the DRX, or does not start the DRX duration timer, or, whether the UE starts the DRX duration timer at the starting position of the cycle of the DRX is preconfigured by high level signaling.

In the embodiment of the present disclosure, the UE is configured with a cell DTX/DRX, and when the cell DTX/DRX is in the inactive duration, if the UE has uplink data arriving, the method may include: starting a random-access process (RACH process) with the cell DTX and/or cell DRX being in the inactive time; if the random-access process competes successfully, determining that the cell DTX and/or cell DRX switches to the active time. If the UE starts the RACH process and competes successfully, then for this UE, the cell DTX/DRX can be considered to have switched to the active duration from the inactive duration after the RACH process has competed successfully. In other words, the UE wakes up the cell by the RACH process.

As can be seen from the introduction above, the size of the cell DTX/DRX cycle, the starting position of the cycle, and the duration of the active duration in the cycle can be configured semi-statically by high level signaling. In the embodiment of the present disclosure, in order to make the cell DTX/DRX state match the actual condition more closely, on top of this, the cell can also dynamically indicate the adjustment of the active duration in a cell DTX/DRX cycle by dynamically adjusting the signaling.

Optionally, the dynamic adjustment signaling includes at least one of following signaling:

(1) first signaling for indicating whether an active time is started, and/or adjusting the duration of the active time at the starting position of a cycle of the cell DTX and/or DRX:

that is, the cell may, by means of the first signaling, dynamically indicate whether the active duration in a cell DTX/DRX cycle is started, and/or, dynamically adjust the duration of the active duration in the cell DTX/DRX cycle;

(2) second signaling for indicating the cell (DTX and/or DRX) to switch to an inactive time from an active time, or switch to an active time from an inactive time:

that is, the cell may dynamically indicate by second signaling that the cell DTX/DRX active duration has been prematurely ended, or dynamically indicate that the cell DTX/DRX inactive duration has been prematurely ended;

(3) third signaling for indicating that the duration of the active time (the cell DTX and/or DRX) is extended by a predetermined time length:

that is, the cell may dynamically indicate by third signaling that the duration of the cell DTX/DRX active duration is extended by a predetermined time length, wherein the predetermined time length is predefined, preconfigured, or indicated by the third signaling; and/or (4) fourth signaling for indicating that the cell (DTX and/or DRX) is in the active time: that is, the cell may dynamically indicate by the fourth signaling that the cell DTX/DRX is in the active time.

For the embodiment of the present disclosure, any of the above dynamic adjustment signaling may be carried by at least one of: a cell common DCI; a UE group DCI; a physical signal sequence; a medium access control (MAC) control element (CE).

In the embodiment of the present disclosure, this first signaling may also be referred to as dynamic start signaling of the cell DTX/DRX, i.e., the size of the cell DTX/DRX cycle, the starting position of the cell DTX/DRX cycle is semi-statically configured by high level signaling, and whether the cell DTX/DRX active duration is started in a cell DTX/DRX cycle may be indicated dynamically by the first signaling. In addition, the duration of the active duration in a cell DTX/DRX cycle is semi-statically configured via high level signaling, and the duration of the cell DTX/DRX active duration in a cell DTX/DRX cycle may be dynamically adjusted via the first signaling. For example, the first signaling also indicates that the duration of the started cell DTX/DRX active duration is one of a plurality of preconfigured time lengths.

Optionally, the first signaling is detected during the first-time window and based on the monitoring result of the first signaling, it is determined whether the active time is started. That is, the cell indicates to the UE via the first signaling whether the cell DTX/DRX active duration is started, and the UE monitors the first signaling during the first-time window.

Specifically, if the first signaling is not detected, it is predefined, or preconfigured, whether the active time is started at the starting position of the cycle of the corresponding cell DTX and/or cell DRX. In particular, at least one of the following outcomes may be determined: (1) the active time is not started at the starting position of the cycle of the cell DTX and/or the cell DRX; (2) the active time is started at the starting position of the cycle of the cell DTX and/or the cell DRX; (3) whether the active time is started at the starting position of the cycle of the cell DTX and/or the cell DRX is preconfigured. That is, if the first signaling is not detected by the UE, then it is determined by default that the active duration of the corresponding cell DTX/DRX cycle is not started, or, it is determined by default that the active duration of the corresponding cell DTX/DRX cycle is started, or, based on the high level signaling configuration, it is determined by default that the active duration of the corresponding cell DTX/DRX cycle is not started, or is started.

Alternatively, if the first signaling is detected, it is predefined, or determined based on the indication of the first signaling, whether the active time is started at the starting position of the cycle of the corresponding cell DTX and/or cell DRX. Specifically, at least one of the following outcomes may be determined: (1) the active time is started at the starting position of the cycle of the cell DTX and/or the cell DRX; (2) the active time is not started at the starting position of the cycle of the cell DTX and/or the cell DRX; (3) it is determined whether the active time is started at the starting position of the cycle of the cell DTX and/or the cell DRX according to the indication of the first signaling. That is, if the first signaling is detected by the UE, then it is determined by default that the active duration of the corresponding cell DTX/DRX cycle is started, or, it is determined by default that the active duration of the corresponding cell DTX/DRX cycle is not started; or, if the first signaling is detected by the UE, then according to the indication information of the first signaling, it is determined whether the active duration of the corresponding cell DTX/DRX cycle is started.

For the embodiment of the present disclosure, the first signaling for indicating whether the cell DTX/DRX active duration is started may be carried by the cell common DCI, or by the UE group DCI, e.g., by a 1-bit field to indicate whether the cell DTX/DRX active duration is started, with an indication value of "0" indicating that the cell DTX/DRX active duration is not started, and an indication value of "1" indicating that the cell DTX/DRX active duration is started. The cell common DCI refers to the same DCI which is required to be detected by all the UEs. The PDCCH search space for monitoring the cell common DCI can be configured through the system information block. The UE group DCI refers to the same DCI which is required to be detected by a set of UEs, and the PDCCH search space for monitoring the UE group DCI can be configured through the UE-specific RRC signaling. The radio network temporary identity (RNTI) value used to monitor the cell common DCI or UE group DCI is configured specifically, i.e., the network is preconfigured with an RNTI value for monitoring the DCI format.

In addition, the cell common DCI or UE group DCI used to indicate whether the cell DTX/DRX active duration is started can also dynamically adjust the duration length of the cell DTX/DRX active duration cycle, for example, by indicating one of the two preconfigured cell DTX/DRX active duration durations via a 1-bit field, or, by indicating one of the four preconfigured cell DTX/DRX active duration durations via a 2-bit field.

Alternatively, the first signaling for indicating whether the cell DTX/DRX active duration is started may be carried by a physical signal sequence, e.g., if the physical signal sequence is detected by the UE, then it indicates that the cell DTX/DRX active duration is started, and if the physical signal sequence is not detected by the UE, then it indicates that the cell DTX/DRX active duration is not started. Since the physical signal sequence is used to indicate that the cell DTX/DRX active duration is started, i.e., that the cell DTX/DRX switches to an active time from an inactive time, the physical signal sequence may also be referred to as a cell active signal, or a cell wake-up signal.

Optionally, the starting position or ending position of the first-time window is determined based on the starting position of the cycle of the cell DTX and/or the cell DRX. For example, the first-time window precedes the starting position of the cycle of the cell DTX and/or the cell DRX, follows the starting position of the cycle of the cell DTX and/or the cell DRX, or the first-time window ends at a position that satisfies a first gap before the starting position of the cycle of the cell DTX and/or the cell DRX. For example, the starting position of the first-time window is determined based on a relative offset from the starting position of the cycle of the cell DTX and/or the cell DRX, the value of the relative offset being preconfigured by the base station via high level signaling.

Optionally, the length of the first-time window is predefined or preconfigured. Optionally, the length of the first gap is predefined, preconfigured, or reported via the UE.

Figure 8:
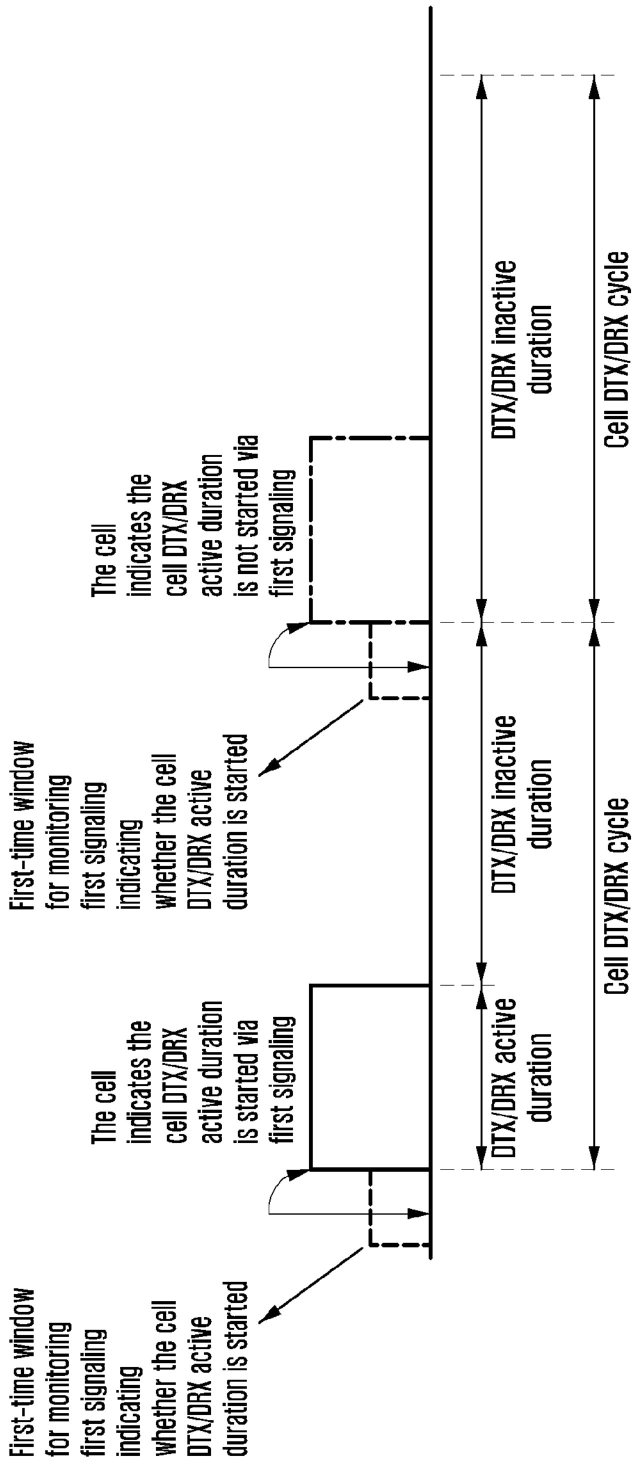
FIG. 8 illustrates an example of a monitoring first signaling according to an embodiment of the present disclosure.
Figure 9:
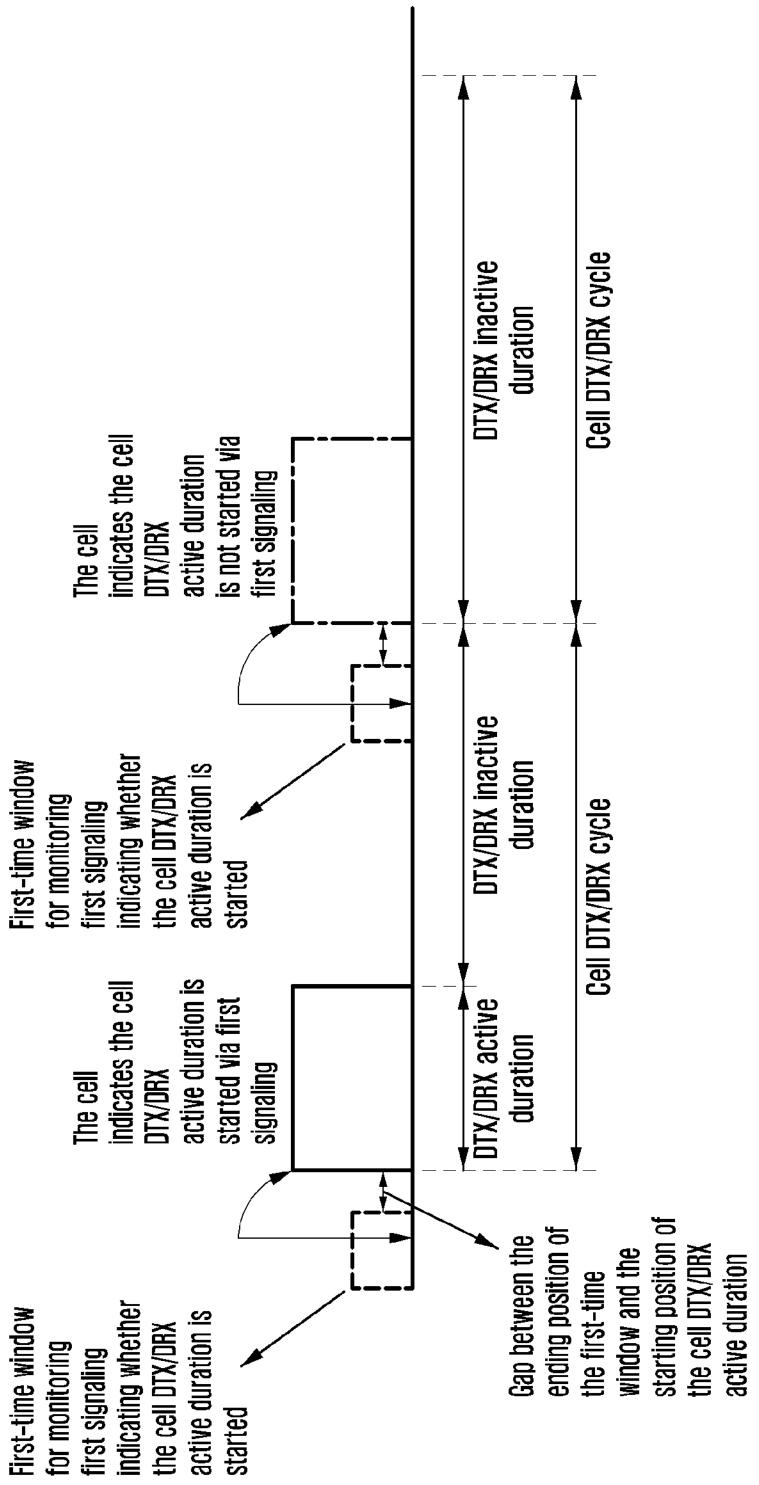
FIG. 9 illustrates an example of a monitoring first signaling according to an embodiment of the present disclosure.

Specifically, the first-time window for monitoring the first signaling indicating whether the cell DTX/DRX active duration is started may be before the starting position of the cell DTX/DRX cycle, for example, the UE monitors the first signaling indicating whether the cell DTX/DRX active duration is started in a predetermined first-time window before the starting position of each cell DTX/DRX cycle, determines based on the monitoring results whether the cell DTX/DRX active duration is started. As shown in FIG. 8 and FIG. 9, in FIG. 8, the ending position of the predetermined first-time window is the starting position of the cell DTX/DRX cycle, and in FIG. 9, the ending position of the predetermined first-time window is the predetermined first gap position before the starting position of the cell DTX/DRX cycle, the predetermined first gap is mainly used to reserve the warm-up time for the UE to switch to the active time from the dormant state, e.g., for the UE to achieve more precise downlink synchronization, etc.

In the embodiment of the present disclosure, if the cell DTX/DRX is in the active time, it does not monitor the first signaling during the first-time window. That is, if the cell DTX/DRX state is the active duration during the predetermined first-time window, then the UE does not need to monitor the first signaling and the active duration is started by default at the starting position of the corresponding cell DTX/DRX cycle. In other words, the UE only monitors the first signaling during the predetermined first-time window if the cell DTX/DRX state is the inactive duration, i.e., when the cell DTX and/or the cell DRX is in the inactive time, the UE monitors the first signaling during the first-time window.

Figure 10:
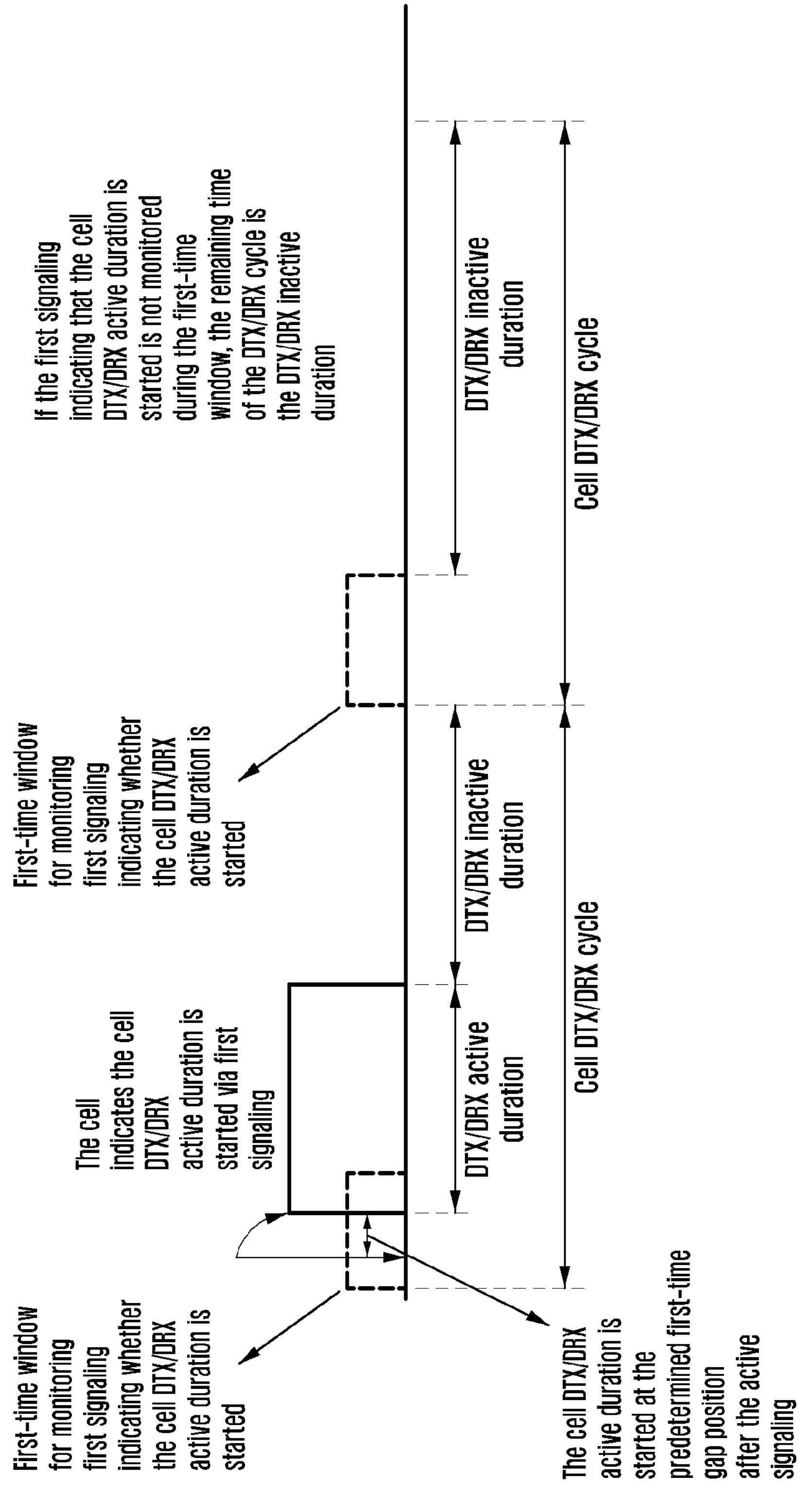
FIG. 10 illustrates an example of a monitoring first signaling according to an embodiment of the present disclosure.

Alternatively, the first-time window for monitoring the first signaling indicating whether the cell DTX/DRX active duration is started may be after the starting position of the cell DTX/DRX cycle, and the UE monitors the first signaling indicating whether the cell DTX/DRX active duration is started during a predetermined first-time window starting from the starting position of each cell DTX/DRX cycle and determines, based on the monitoring result, whether the cell DTX/DRX active duration is started. As shown in FIG. 10, if the first signaling used to indicate that the cell DTX/DRX active duration is started during the predetermined first-time window is detected by the UE, and the first signaling indicates or implicitly indicates that the cell DTX/DRX active duration is started, then the UE determines that the cell DTX/DRX switches to the active duration at a predetermined first gap position after the indication signaling; if the first signaling used to indicate that the cell DTX/DRX active duration is started during the predetermined first-time window is not detected by the UE, the UE determines that the cell DTX/DRX switches to the inactive duration during the remaining time of the cell DTX/DRX cycle after the first-time window.

Optionally, if the first signaling during the first-time window is not detected by the UE, then it is determined that no active time is started at the starting position of the cell DTX/DRX, i.e., it can be determined that the current cell DTX/DRX cycle is fully in the inactive duration, i.e., for the remaining time of the current cell DTX/DRX cycle, the cell DTX/DRX may remain in the inactive time until the starting position of the cycle of the next cell DTX/DRX may switch states.

The embodiment of the present disclosure also provides another optional embodiment to determine whether the active time is started at the starting position of the cell DTX/DRX cycle, specifically, if, during the fifth time window starting at the starting position of the cycle of the cell DTX and/or the cell DRX, the DCI for scheduling physical uplink shared channel (PUSCH) or physical downlink shared channel (PDSCH) is detected, it is determined that the active time is started at the starting position of the cell DTX and/or cell DRX cycle; if, during the fifth time window starting at the starting position of the cycle of the cell DTX and/or the cell DRX, the DCI for scheduling PUSCH or PDSCH is not detected, it is determined that the active time is not started at the starting position of the cycle of the cell DTX and/or the cell DRX. Here, the DCI for scheduling a PDSCH may include at least one of DCI for scheduling a unicast PDSCH, DCI for scheduling a multicast PDSCH, and DCI for scheduling a broadcast PDSCH. This method of implicit indication saves signaling overhead compared to the method of explicit indication by first signaling.

In the embodiment of the present disclosure, the third signaling may also be referred to as dynamic extension signaling of the cell DTX/DRX, i.e., when the cell DTX/DRX is in the active time, the cell may dynamically indicate via the third signaling that the duration of the original cell DTX/DRX active duration is extended and correspondingly the cell DTX/DRX inactive duration is shortened.

Optionally, the third signaling is detected during the second time window, wherein the starting position or ending position of the second time window is determined based on the expected ending position of the active time. For example, the second time window precedes the expected ending position of the active time, or the second time window ends at a position that satisfies a second gap before the expected ending position of the active time. For example, the starting position of the second time window is determined based on a relative offset from the expected ending position of the active time, the value of the relative offset being preconfigured by the base station via high level signaling.

Optionally, the length of the second time window is predefined or preconfigured. Optionally, the length of the second gap is predefined, preconfigured, or reported via the UE.

In the embodiment of the present disclosure, the third signaling is used to extend an active duration that is semi-statically configured, or the activate period that was previously dynamically extended by the third signaling, i.e., the third signaling is capable of being received multiple times in a cycle of a cell DTX and/or a cell DRX. The third signaling can be used multiple times in a cell DTX/DRX cycle, i.e., the cell DTX/DRX active duration can be extended multiple times, and the cell DTX/DRX active duration can be extended up to occupy the entire cell DTX/DRX cycle, i.e., the cell DTX/DRX remains active for the entire cycle. For example, near the end of the semi-statically configured cell DTX/DRX active duration, the cell dynamically extends the cell DTX/DRX active duration by a first length via the third signaling, and near the end of the cell DTX/DRX active duration after extending by the first length, the cell again extends the cell DTX/DRX active duration by a second length via the third signaling, and so on.

Figure 11:
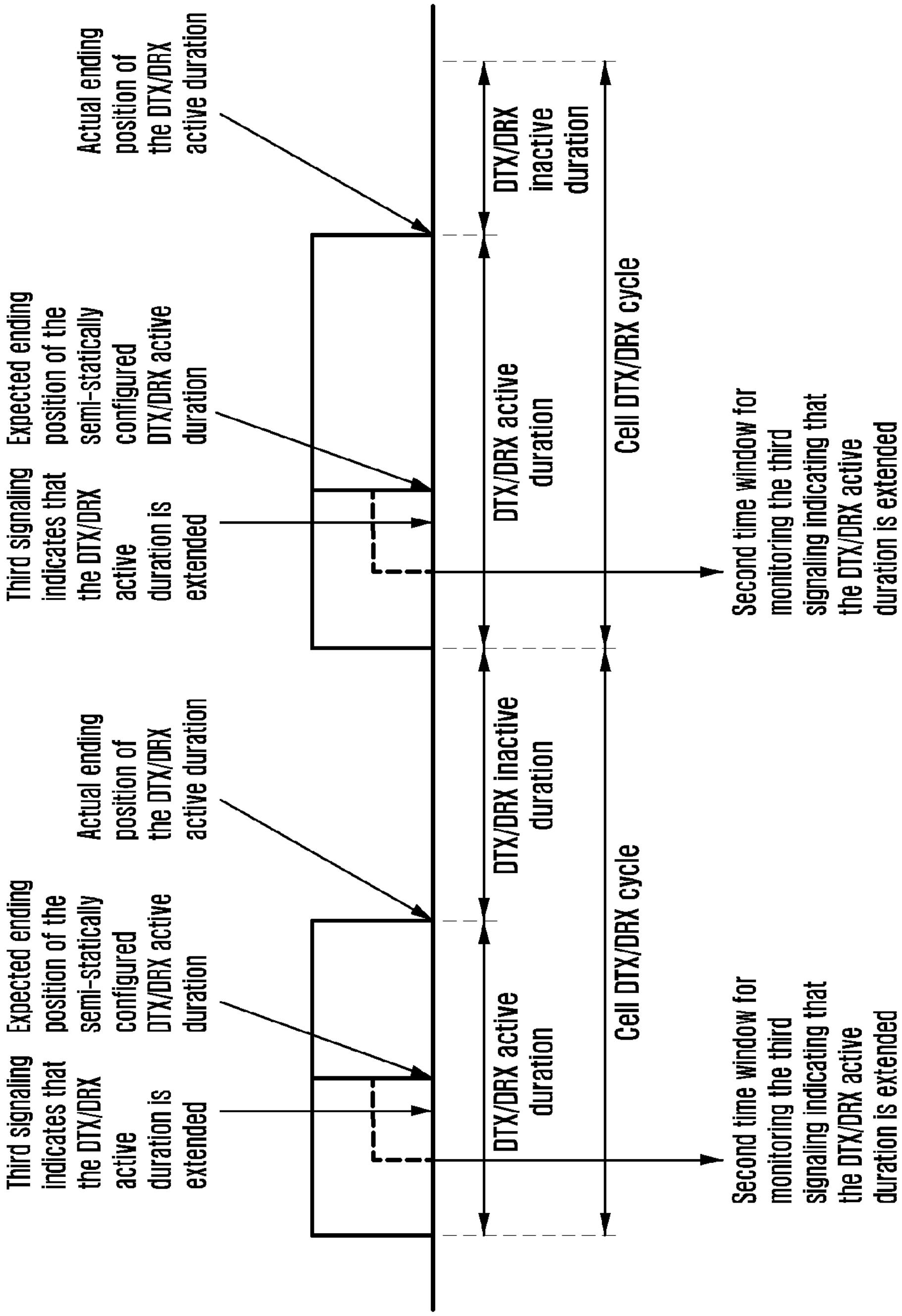
FIG. 11 illustrates an example of a third signaling indication according to an embodiment of the present disclosure.

As shown in FIG. 11, when the cell DTX/DRX is in the active time, the cell indicates the cell DTX/DRX active duration to be extended by the third signaling (e.g., cell common DCI, UE group DCI or MAC CE), i.e., the cell DTX/DRX active duration is extended for an additional duration on top of the original length. The additionally extended predetermined time length can be configured semi-statically or indicated by dynamic extension signaling. For example, the dynamic extension signaling may also indicate the extension of one of a plurality of preconfigured time lengths. As shown in FIG. 11, the cell extends the cell DTX/DRX active duration by the third signaling during the time window before the end of the semi-statically configured cell DTX/DRX active duration.

In one embodiment of the present disclosure, the second signaling may also be referred to as dynamic switching signaling of the cell DTX/DRX. When the cell DTX/DRX is in the active time, the cell may dynamically indicate the cell DTX/DRX to switch from the active time to the inactive time by the second signaling, i.e., the cell DTX/DRX switches to the inactive duration from the active duration.

Specifically, at the location of the fourth gap after receiving the second signaling it is determined that the cell switches to the inactive time from the active time, or from the inactive time to the active time, wherein the size of the fourth gap is predefined, preconfigured, or indicated by the second signaling.

Figure 12:
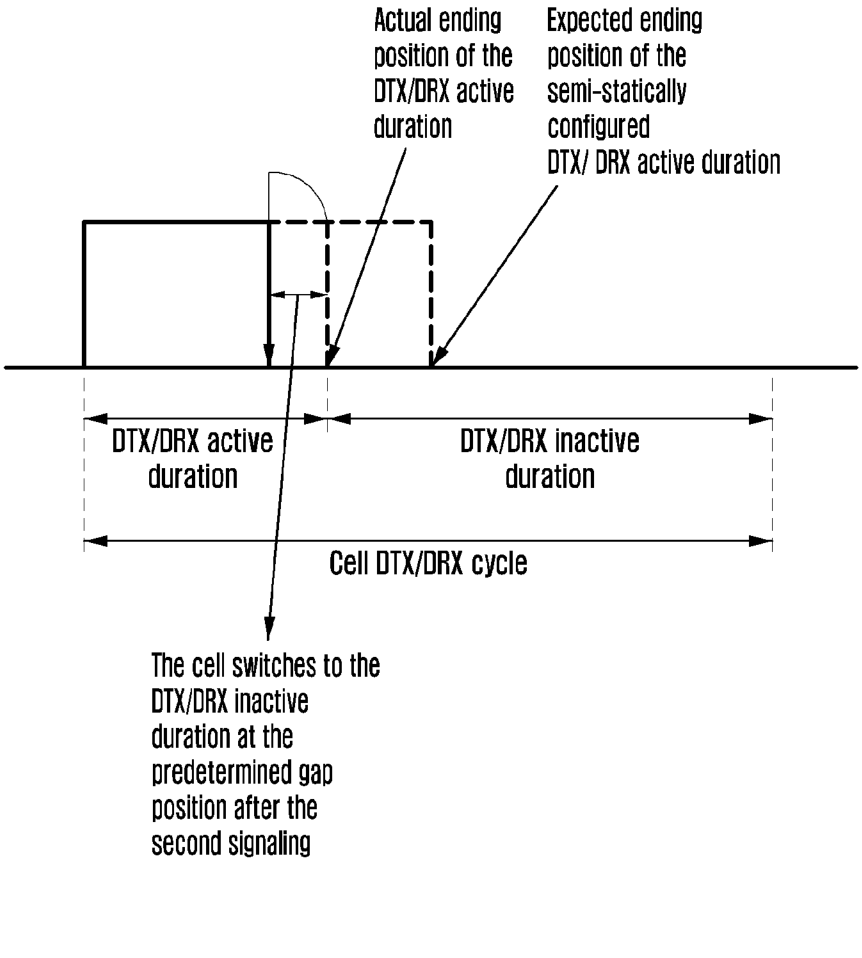
FIG. 12 illustrates an example of a second signaling indication according to an embodiment of the present disclosure.

When the cell DTX/DRX is in the active time and the cell indicates that the cell DTX/DRX switches from the active time to the inactive time by the second signaling (e.g., cell common DCI, UE group DCI or MAC CE), assuming that the second signaling is carried via the DCI, then at a predefined fourth gap position after the DCI, the cell DTX/DRX switches from the active time to the inactive time, assuming that the second signaling is carried via the MAC CE, the cell DTX/DRX switches from the active time to the inactive time at the predetermined fourth gap after the corresponding hybrid automatic repeat request (HARQ) feedback of the MAC CE has been transmitted. The second signaling can be transmitted during the cell DTX/DRX active duration which is semi-statically configured, as shown in FIG. 12, i.e., it is equivalent to the cell DTX/DRX active duration which is semi-statically configured being ended prematurely. The second signaling can also be transmitted during the cell DTX/DRX active duration that is dynamically extended by the second signaling as described above, i.e., equivalent to the dynamically extended cell DTX/DRX active duration being ended prematurely.

In the embodiment of the present disclosure, the purpose of the cell DTX/DRX technology is to save network side power, while applying the cell DTX/DRX technology, the RRC-connected state UE in the cell may be configured with UE DRX for saving terminal side power, considering that the UE does not monitor PDCCHs other than DCI format 2-6 during the UE DRX inactive duration, for the above multiple dynamic adjustment signaling of the cell DTX/DRX in the above multiple embodiments (FIG. 8 to FIG. 12), the UE's understanding of whether the cell DTX/DRX is in the active time may not be consistent with the network side if not detected due to the UE happening to be in the DRX inactive duration.

In one example, the RRC-connected state UE is configured with the UE DRX as well as the cell DTX/DRX, and the UE monitors the cell DTX/DRX dynamic adjustment signaling as described previously only during the DRX active duration, including at least one of the first signaling, the second signaling and the third signaling. During the UE DRX inactive duration, the UE does not need to monitor the cell DTX/DRX dynamic adjustment signaling as previously described.

In another example, the RRC connected UE is configured with the UE DRX and the cell DTX/DRX and monitors the dynamic adjustment signaling regardless of whether the UE DRX is in the active time or in the inactive time, i.e., the UE needs to monitor the cell DTX/DRX dynamic adjustment signaling as described in the previous section, including at least one of the first signaling, second signaling and third signaling, regardless of whether the UE is in the DRX active duration. In other words, the UE needs to monitor the cell DTX/DRX dynamic adjustment signaling as described above even if the UE is in the DRX inactive duration.

In fact, during the DRX inactive duration of the UE, the UE does not care whether the cell DTX/DRX is in the active time because the UE is in the dormant state, the UE only cares more about whether the cell DTX/DRX is in the active time during the DRX active duration. Therefore, in order for the UE to achieve longer dormancy, in a further option, the UE may monitor the fourth signaling used to indicate whether the cell DTX/DRX is being in the active time near the starting position of its own DRX cycle. For example, the fourth signaling is detected during the third time window.

Optionally, the UE is configured with a DRX on the UE side and the starting position or ending position of the third time window is determined based on the starting position of the cycle of the UE DRX. For example, the third time window precedes the starting position of the cycle of the UE DRX, follows the starting position of the cycle of the UE DRX, or the third time window ends at a position that satisfies the third gap before the starting position of the cycle of the UE DRX. For example, the starting position of the third time window is determined based on a relative offset from the starting position of the DRX cycle, the value of the relative offset being preconfigured by the base station via high level signaling.

Optionally, the length of the third time window is predefined or preconfigured. Optionally, the length of the third gap is predefined, preconfigured, or reported via the UE.

Specifically, the RRC-connected UE is configured with a DRX on the UE side and a cell DTX/DRX, and the UE monitors the fourth signaling for indicating whether the cell DTX/DRX is being in the active time during a predetermined third time window before or after the starting position of the DRX cycle, e.g., the fourth signaling is carried via a UE group DCI or physical signal sequence, and if the fourth signaling is detected by the UE during the third time window, then it is determined that the cell DTX/DRX is in the active time; if the fourth signaling is not detected by the UE during the third time window, then it is determined that the cell DTX/DRX is in the inactive time. Assuming that the cell DTX/DRX has only one state switching point in a cycle, i.e., at most one active duration or one inactive duration in a cycle, then it is determined that the cell DTX/DRX is in the inactive time during the remaining time of the current cell DTX/DRX cycle, the cell DTX/DRX may remain in the inactive time until the starting position of the next cell DTX/DRX cycle may switch states.

Figure 13:
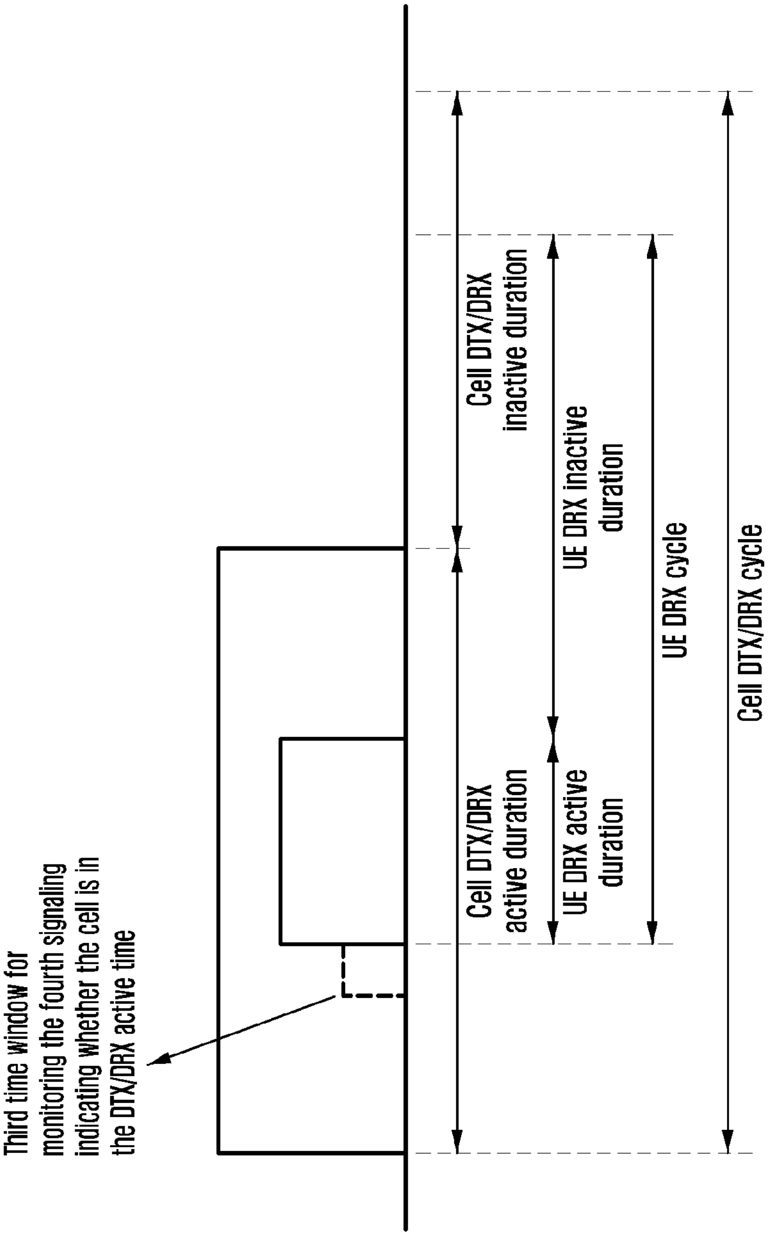
FIG. 13 illustrates an example of a monitoring fourth signaling according to an embodiment of the present disclosure.
Figure 14:
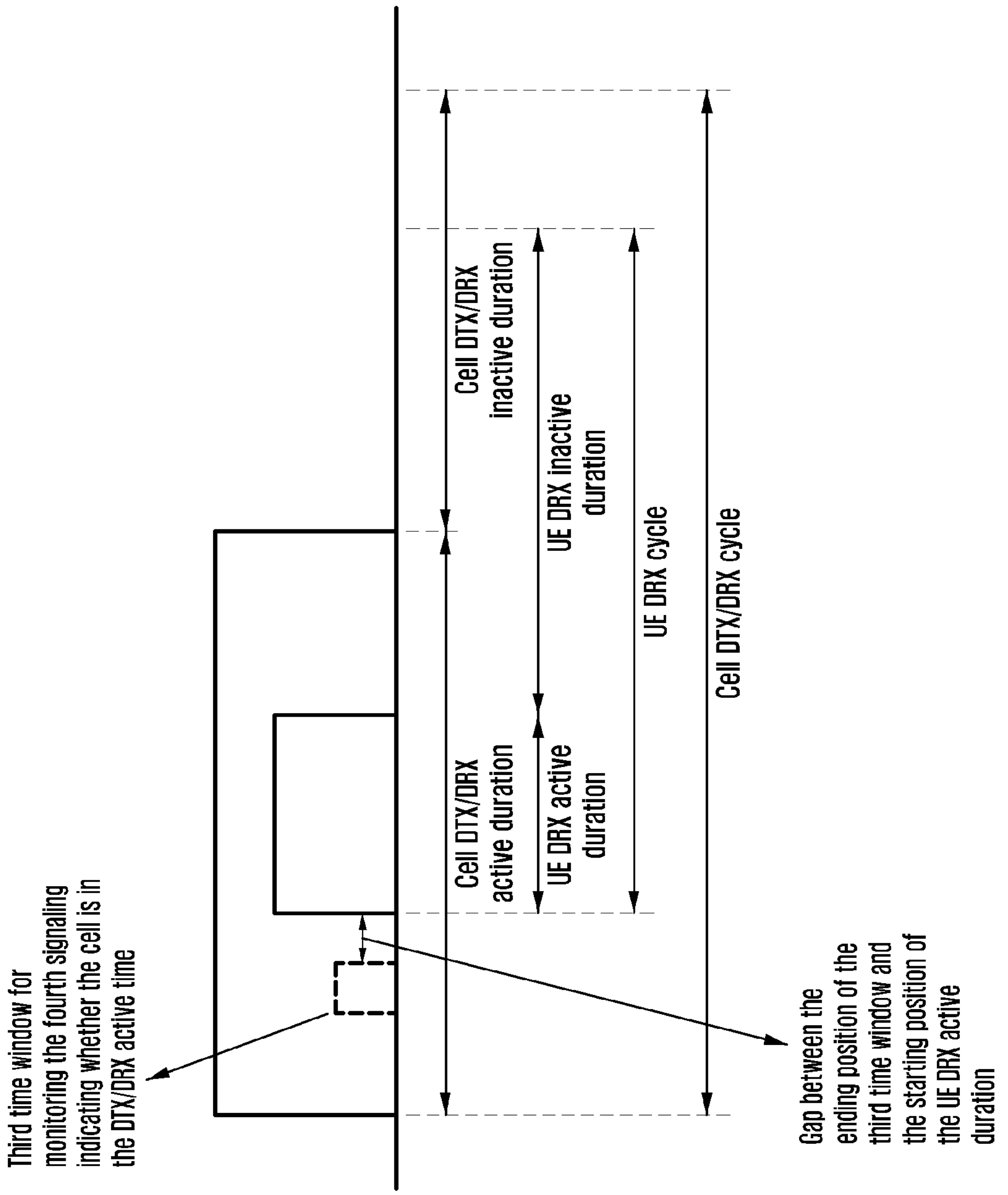
FIG. 14 illustrates an example of a monitoring fourth signaling according to an embodiment of the present disclosure.

As shown in FIG. 13 and FIG. 14, the semi-statically configured UE DRX active duration is all in the semi-statically configured cell DTX/DRX active duration and the UE monitors the fourth signaling indicating whether the cell DTX/DRX is being in the active duration during the predetermined third time window. In FIG. 13, the ending position of the predetermined third time window is the starting position of the UE DRX cycle, and in FIG. 14, the ending position of the predetermined third time window is the predetermined third gap position before the starting position of the UE DRX cycle, the predetermined third gap being mainly used to reserve warm-up time for the UE to switch to the active time from the dormant state, e.g., for the UE to achieve more precise downlink synchronization, etc.

In a further option, the RRC-connected state UE is configured with a cell DTX/DRX and a DRX on the UE side, and the UE monitors at least one of the first signaling, second signaling and third signaling of the cell DTX/DRX as described above, or the fourth signaling indicating whether the cell DTX/DRX is being in the active time, during a time window starting at the starting position of the DRX cycle.

In the embodiment of the present disclosure, the fourth signaling is detected during the third time window in at least one of following conditions (1) the starting position of the cycle of the UE DRX is in the duration of the active time in a semi-static configuration, and (2) the starting position of the cycle of the UE DRX is in the duration of the active time extended based on dynamic adjustment signaling.

Figure 15:
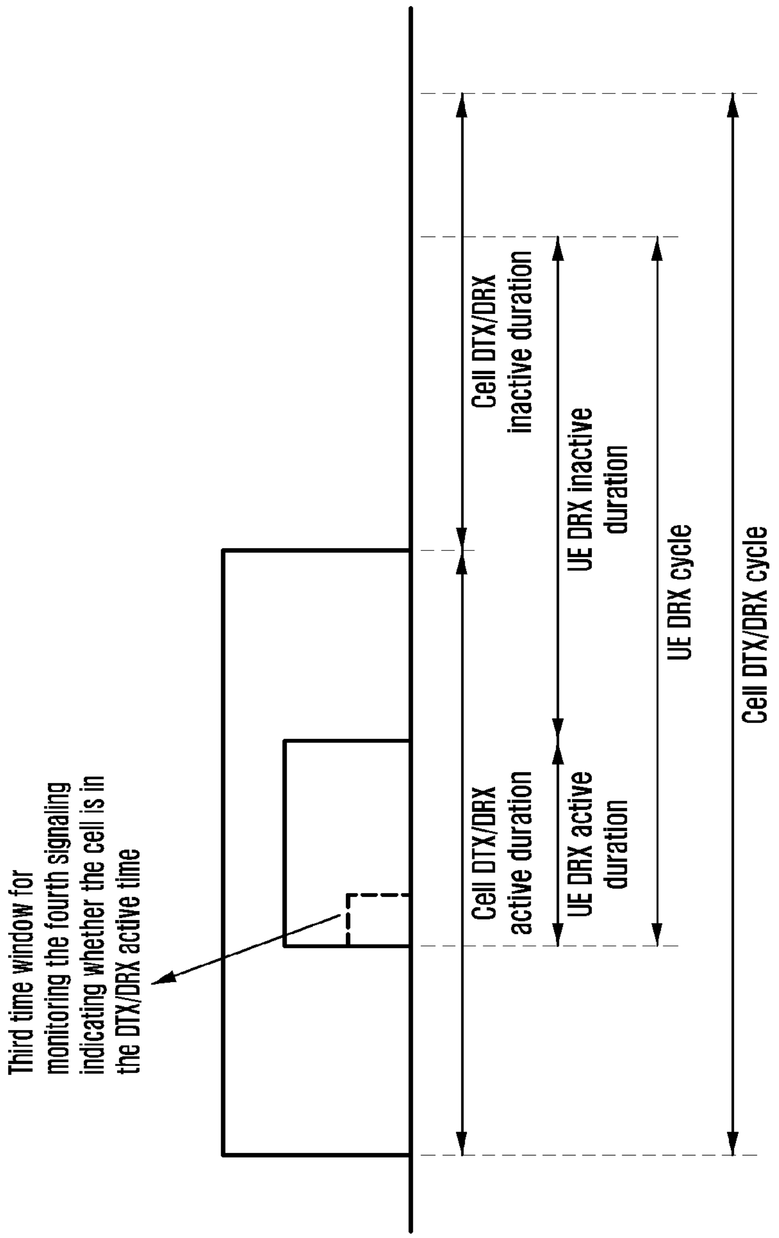
FIG. 15 illustrates another example of a monitoring fourth signaling according to an embodiment of the present disclosure.

As shown in FIG. 15, the semi-statically configured UE DRX active duration is all in the semi-statically configured cell DTX/DRX active duration, and the UE monitors the fourth signaling indicating whether the cell DTX/DRX is being in the active time during a predetermined time window starting from the starting position of its own DRX cycle.

Figure 16:
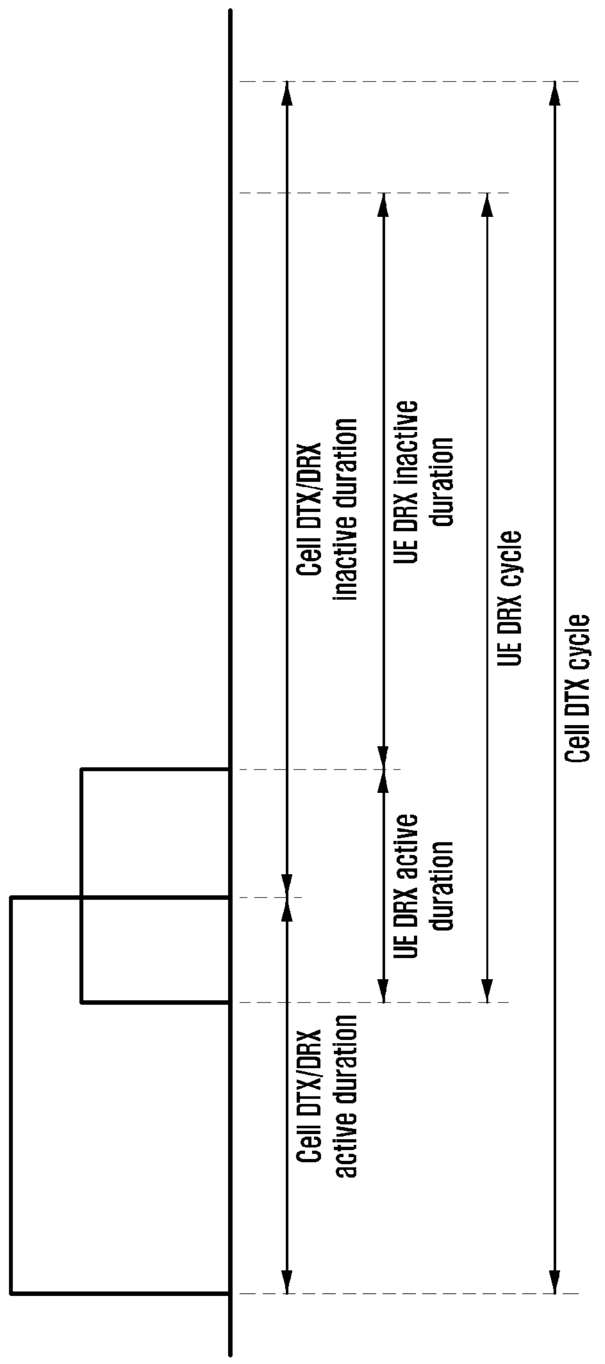
FIG. 16 illustrates an example of a UE DRX and cell DTX/DRX scenario according to an embodiment of the present disclosure.

If the semi-statically configured UE DRX active duration is all in the semi-statically configured cell DTX/DRX active duration, as shown in FIG. 13, FIG. 14, and FIG. 15, or, if the front end of the semi-statically configured UE DRX active duration overlaps with the semi-statically configured cell DTX/DRX active duration, as shown in FIG. 16, whether to monitor the dynamic adjustment signaling may be as follows:

(1) assuming that the system does not apply dynamic first signaling to indicate whether the cell DTX/DRX active duration is started and does not apply dynamic second signaling to indicate that the cell DTX/DRX switches from the active time to the inactive time, the UE can determine that the cell DTX/DRX is in the active time near the DRX starting position without monitoring the fourth signaling used to indicate that the cell DTX/DRX is in the active time; and/or (2) assuming that the system applies dynamic first signaling to indicate whether the cell DTX/DRX active duration is started, or applies dynamic second signaling to indicate that the cell DTX/DRX switches from the active time to the inactive time, then the cell DTX/DRX may be in the active or inactive time near the starting position of the DRX cycle, and therefore the UE needs to monitor the fourth signaling used to indicate that the cell DTX/DRX is in the active time near the starting position of the DRX cycle (e.g., the third time window before or after).

Figure 17:
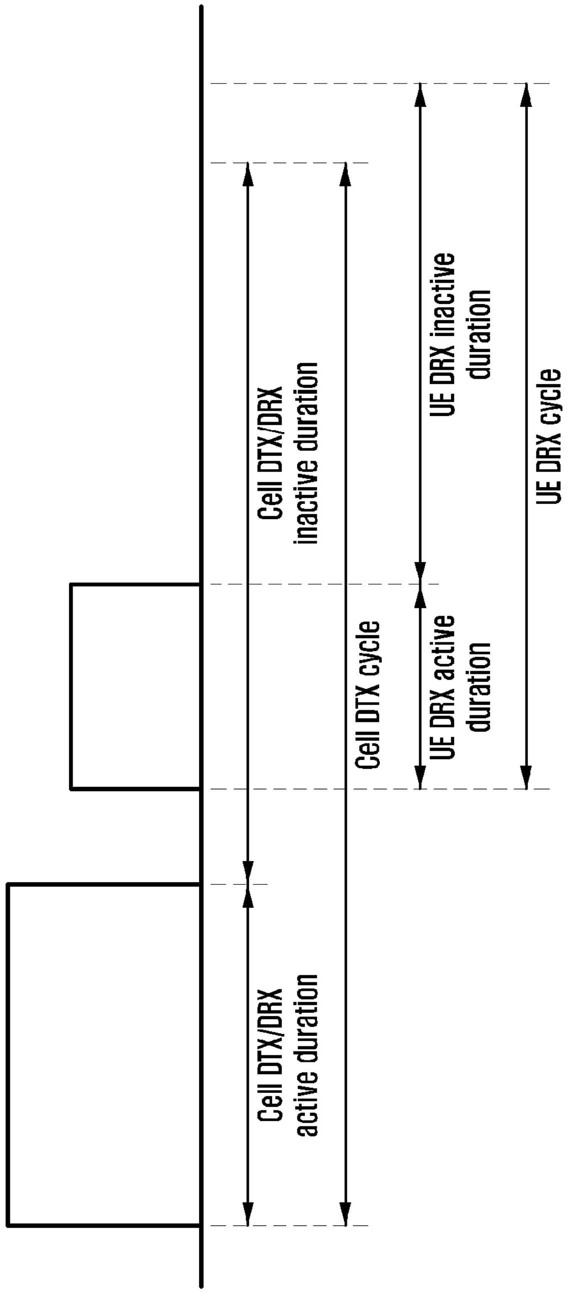
FIG. 17 illustrates another example of a UE DRX and cell DTX/DRX scenario according to an embodiment of the present disclosure.

If the semi-statically configured UE DRX active duration fully in the semi-statically configured cell DTX/DRX inactive duration, as shown in FIG. 17, whether to monitor dynamic adjustment signaling can be as follows:

(1) if the system does not apply dynamic third signaling to extend the semi-statically configured cell DTX/DRX active duration, then the UE can determine that the cell DTX/DRX is in the inactive time during the UE DRX active duration without monitoring the fourth signaling used to indicate that the cell DTX/DRX is in the active time; and/or (2) if the system applies dynamic third signaling to extend the semi-statically configured cell DTX/DRX active duration, the cell DTX/DRX may be in the active or inactive time near the starting position of the UE DRX cycle, and therefore the UE needs to monitor the fourth signaling used to indicate that the cell DTX/DRX is in the active time near the starting position of the DRX cycle (e.g., the third time window before or after).

Figure 18:
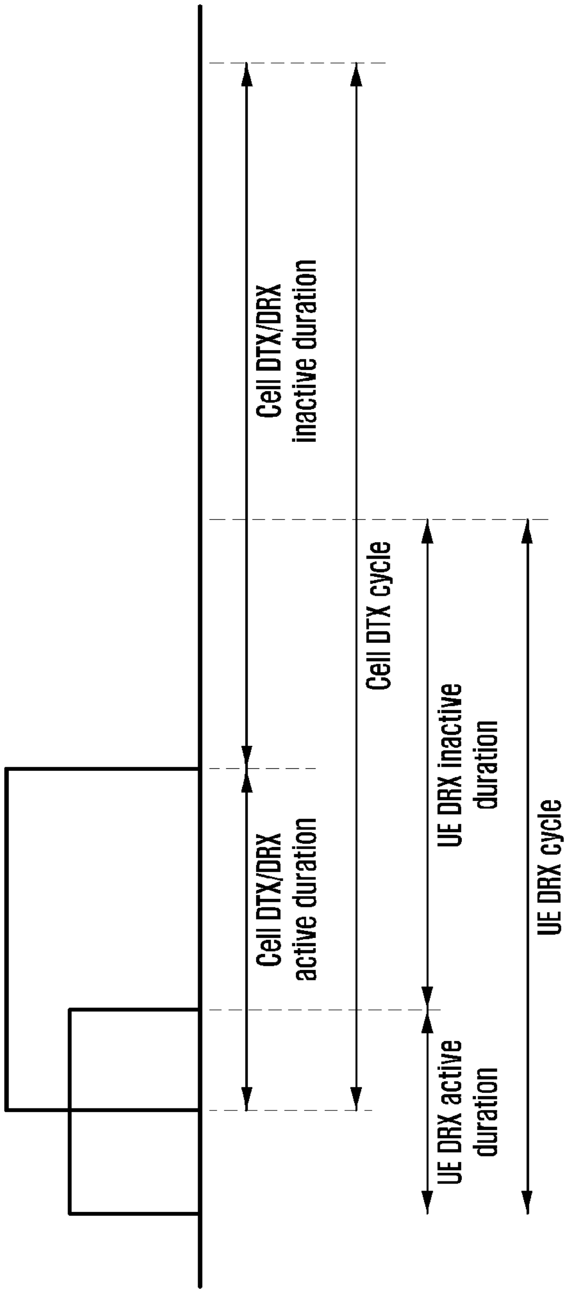
FIG. 18 illustrates yet another example of a UE DRX and cell DTX/DRX scenario according to an embodiment of the present disclosure.

If the back end of the semi-statically configured UE DRX active duration overlaps with the semi-statically configured cell DTX/DRX active duration, as shown in FIG. 18, whether to monitor the dynamic adjustment signaling may be as follows:

(1) if the system does not apply the dynamic third signaling to extend the semi-statically configured cell DTX/DRX active duration, then the UE can determine that the cell DTX/DRX is in the inactive time without monitoring the fourth signaling used to indicate that the cell DTX/DRX is in the active time near the starting position of the UE DRX cycle;

(2) if the system applies the dynamic third signaling to extend the semi-statically configured cell DTX/DRX active duration, the cell DTX/DRX may be in the active or inactive time near the starting position of the UE DRX cycle, so the UE needs to monitor the fourth signaling used to indicate that the cell DTX/DRX is in the active time near the starting position of the DRX cycle (the third time window before or after), and determines the state of the cell DTX/DRX according to the monitoring result;

(3) assuming that the system does not apply dynamic first signaling to indicate whether the cell DTX/DRX active duration is started and does not apply dynamic second signaling to indicate the cell DTX/DRX to switch from the active time to the inactive time, then during the overlap time in FIG. 18, the UE can determine that the cell DTX/DRX is in the inactive time without monitoring the fourth signaling used to indicate that the cell DTX/DRX is in the active time; and/or (4) assuming that the system applies dynamic first signaling to indicate whether the cell DTX/DRX active duration has been started, the cell DTX/DRX may be in the inactive time during the overlap time of FIG. 18, and the UE needs to monitor, near the starting position of the cell DTX/DRX cycle (in the first-time window before or after), the first signaling indicating whether the active time is started at the starting position of the cell DTX/DRX cycle, as in the previous method of FIG. 8, FIG. 9 or FIG. 10.

In the embodiment of the present disclosure, whether the UE monitors the fourth signaling indicating whether the cell DTX/DRX is in the active time near the starting position of the DRX cycle (in the third time window before or after) is related to whether the UE is configured to monitor DCI format 2-6, and if the UE is not configured to monitor DCI format 2-6, then the UE monitors the fourth signaling indicating whether the cell DTX/DRX is being in the active time during the third time window.

If the UE is configured to monitor DCI format 2-6, the UE monitors fourth signaling during the third time window, including at least one of the following scenarios:

(1) not monitoring the fourth signaling, monitoring DCI format 2-6, and if DCI format 2-6 is detected, then it is determined that the cell DTX and/or cell DRX is being in the active time, and/or, if DCI format 2-6 is not detected, then it is determined that the cell DTX and/or the cell DRX is being in the inactive time;

(2) monitoring the fourth signaling, if the fourth signaling is detected, then monitoring DCI format 2-6; That is, monitoring the fourth signaling during the third time window, and based on the monitoring result of the fourth signaling, determining whether to monitor DCI format 2-6. If the fourth signaling is detected, then determining that the cell DTX/DRX is in the active time, then monitoring DCI format 2-6 again; if the fourth signaling is not detected, then determining that the cell DTX/DRX is being in the inactive time, then there is no need to monitor DCI format 2-6, correspondingly, drx-onDurationTimer is not started at the UE DRX starting position, or drx-onDurationTimer is started, or whether drx-onDuration Timer is started at the UE DRX starting position can be preconfigured by high level signaling;

(3) monitoring DCI format 2-6 and, determining whether to monitor the fourth signaling during the third time window based on the monitoring result of DCI format 2-6; optionally, monitoring DCI format 2-6 and, if DCI format 2-6 is detected and indicating to start the DRX duration timer, then monitoring the fourth signaling again, e.g., if it is detected that DCI format 2-6 indicates to start drx-onDuration Timer, then the UE starts the drx-onDuration Timer and monitors the fourth signaling during the third time window, otherwise the UE does not start drx-onDuration Timer and does not need to monitor the fourth signaling during the third time window; and/or (4) monitoring the fourth signaling and monitoring DCI format 2-6. That is, in addition to monitoring the fourth signaling during the third time window, also monitoring DCI format 2-6.

The embodiment of the present disclosure also provides another optional embodiment to determine whether the cell DTX/DRX is in the active time, specifically, the UE is configured with a DRX on the UE side and determines that the cell DTX and/or cell DRX is in the active time if the DCI for scheduling the PUSCH or PDSCH is detected during the sixth time window starting at the starting position of the cycle of the UE DRX; determines that the cell DTX and/or the cell DRX is in the inactive time if no DCI for scheduling the PUSCH or PDSCH is detected during the sixth time window starting at the starting position of the cycle of the DRX. This method of implicit indication saves signaling overhead compared to the method of explicit indication via fourth signaling. Here, the DCI for scheduling a PDSCH may include at least one of DCI for scheduling a unicast PDSCH, DCI for scheduling a multicast PDSCH, and DCI for scheduling a broadcast PDSCH.

It is to be noted that for the various predetermined time windows mentioned above, the length of the time windows etc. may be predefined, or preconfigured by the base station via high level signaling, and for the various predetermined gaps mentioned above, the length of the gaps etc. may be predefined, preconfigured by the base station via high level signaling, or indicated by the base station via DTX/DRX dynamic adjustment signaling.

In practice, the cell DTX/DRX techniques of the preceding embodiments can be used in a single-cell scenario, i.e., a scenario where the UE has only one serving cell; and/or, the cell DTX/DRX techniques of the preceding embodiments can be used in a multi-cell scenario, where the multi-cell scenario includes carrier aggregation (CA) or dual connection (DC), where the cell includes at least one of a secondary cell, a primary cell and a primary secondary cell. In the multi-cell scenario, the cell DTX/DRX technology is only used for the secondary cell Scell, the primary cell Pcell and the primary secondary cell PScell cannot be configured with cell DTX/DRX, or, the cell DTX/DRX technology can be used for all cells including Scell, Pcell and PScell.

In one example, the UE is configured with cell DTX/DRX for a plurality of serving cells, and all cells configured with cell DTX/DRX share the same cell DTX/DRX configuration, i.e., all cells configured with cell DTX/DRX use the same size of the cell DTX/DRX cycle, the same starting position of the cell DTX/DRX cycle, the same duration of the cell DTX/DRX active duration, etc.

In another example, the UE is configured with cell DTX/DRX for a plurality of serving cells, and the configuration information related to at least one cell DTX and/or cell DRX can be used for a plurality of serving cells, i.e., a plurality of serving cells share the same cell DTX and/or cell DRX configuration, i.e., the cells being configured with the cell DTX/DRX can use the same or different cell DTX/DRX configurations, e.g., there are two cell DTX/DRX configurations, each serving cell can be associated to one of them, i.e., one cell DTX/DRX configuration can be applied to one or more serving cells.

In one example, the UE is configured with cell DTX/DRX for a plurality of serving cells, wherein the plurality of cells of the UE are configured with the cell DTX and/or cell DRX separately, i.e., each cell may be independently configured with cell DTX/DRX separately, i.e., each cell may use different sizes of the cell DTX/DRX cycle, different cell DTX/DRX cycle starting positions, different cell DTX/DRX active duration durations, etc.

In the embodiment of the present disclosure, the secondary cell of the UE is configured with cell DTX and/or cell DRX, and the semi-static configuration information and/or dynamic adjustment signaling (associated with the configured cell DTX and/or cell DRX) of the secondary cell is transmitted on the primary cell of the UE, i.e., the semi-static configuration information and/or dynamic adjustment signaling of the secondary cell is received on the primary cell of the UE in step S101. For example, the primary cell indicates whether the DTX/DRX active duration on the secondary cell is started by a cell common DCI, a UE group common DCI or a physical signal sequence, etc.

Figure 20:
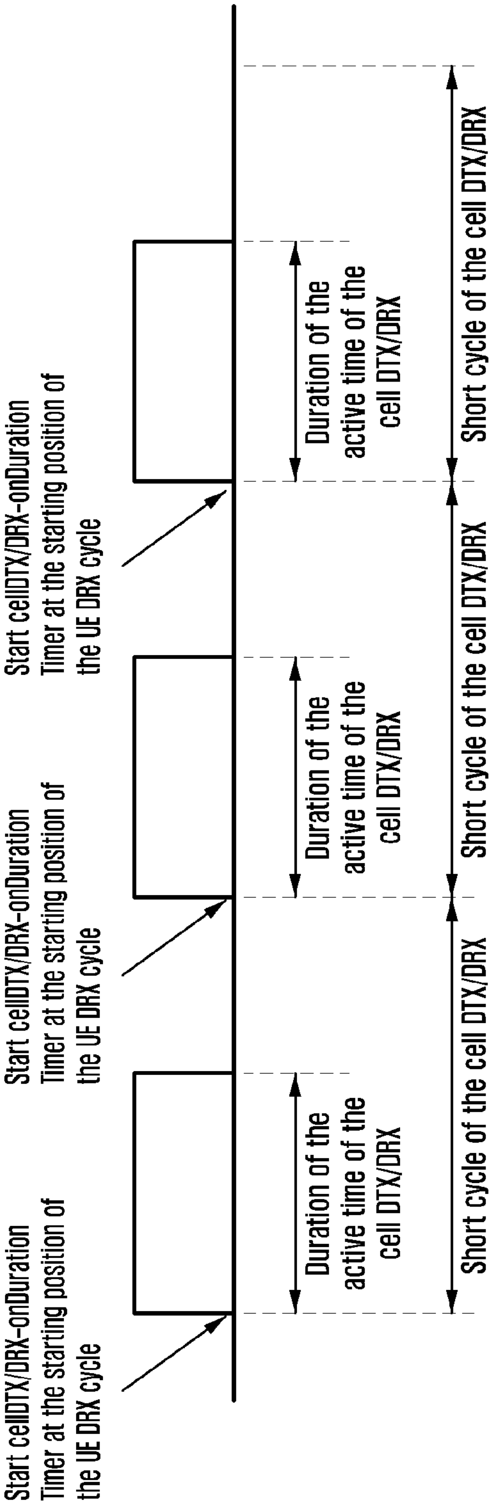
FIG. 20 illustrates an example of a duration timer (onDurationTimer) for applying a cell DTX/DRX according to an embodiment of the present disclosure.

In one implementation, timers are used to control the state switching of the cell DTX/DRX, e.g., the duration timer cellDTXDRX-onDurationTimer is defined such that at the starting position of each cycle of the cell DTX/DRX, the UE starts cellDTXDRX-onDuration Timer, as shown in FIG. 20. The size of cellDTXDRX-onDurationTimer is equal to the duration length of the active time of the cell DTX/DRX, i.e., the start of cellDTXDRX-onDuration Timer indicates the start of the duration of the active time of the cell DTX/DRX, the expire of the cellDTXDRX-onDuration Timer indicates the end of the duration of the active time of the cell DTX/DRX. As long as the timer cellDTXDRX-onDurationTimer is running, the UE can determine that the cell DTX/DRX is in the active time.

In addition, the inactivity timer cellDTXDRX-inactivityTimer can also be defined. If the cell has new data transmission, new data including downlink data, uplink data and sidelink data, and the new data transmission means that a new data packet arrives, then it is probable that the cell may continue transmitting data to complete the transmission of this new data packet for some time afterwards, i.e., during a duration after the start of the new data transmission, the cell DTX/DRX is likely to remain in the active time and cannot switch to the inactive time, the active time required due to the arrival of new data can be reflected by the timer cellDTXDRX-inactivity Timer. The size of the cellDTXDRX-inactivity Timer can be configured by a UE-specific RRC signaling. For example, if a new data transmission is detected by the UE, then the UE starts the timer cellDTXDRX-inactivity Timer, or, when the cell is transmitting new data for other UEs, the cell can also indicate the UE other than the UEs being scheduled for the new data transmission to start the timer cellDTXDRX-inactivity Timer via signaling. As long as the timer cellDTXDRX-inactivity Timer is running, the UE can determine that the cell DTX/DRX is in the active time.

Figure 21:
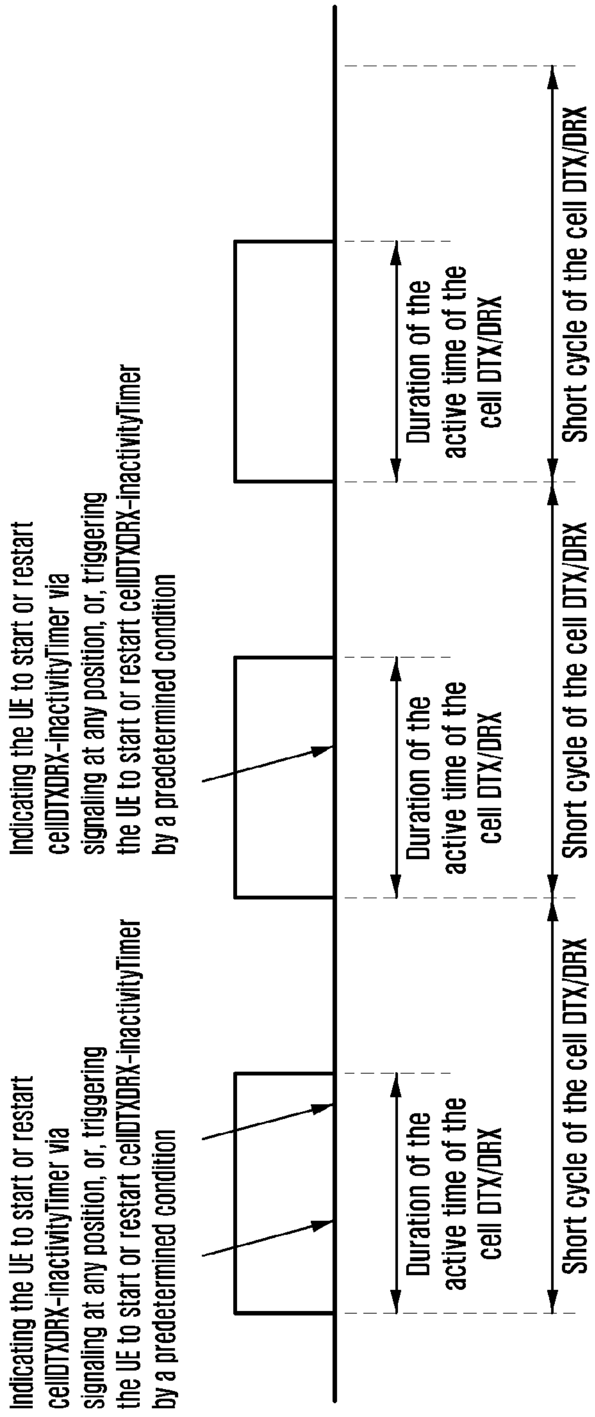
FIG. 21 illustrates an example of an inactivity timer (inactivityTimer) for applying a cell DTX/DRX according to an embodiment of the present disclosure.

As shown in FIG. 21, the timer cellDTXDRX-inactivity Timer can be started at any position in the cell DTX/DRX cycle, it can also be restarted during operation, and the network, by controlling the timer cellDTXDRX-inactivity Timer, can extend the actual duration of the active time of the cell DTX/DRX without being limited to the semi-statically configured duration length, but even can sustains the active time of the cell DTX/DRX for the length of the entire cycle.

The UE starts or restarts the cellDTXDRX-inactivity Timer when at least one of the following conditions is met:

- signaling for indicating the start of the cellDTXDRX-inactivity Timer is received, which may be carried via the MAC CE or the DCI, assuming that the signaling for indicating to start the cellDTXDRX-inactivity Timer is carried via the MAC CE, and the DCI for scheduling the MAC CE may use a C-RNTI or a RNTI value corresponding to multicast or broadcast to scramble, and the UE starts the cellDTXDRX-inactivityTimer at a predefined gap position after the corresponding HARQ feedback of the MAC CE; assuming that the signaling indicating to start the cellDTXDRX-inactivity Timer is carried via the DCI, the DCI may be the cell common DCI or UE group DCI scrambled using a specific RNTI value, the UE starts the cellDTXDRX-inactivity Timer at a predefined gap position after the DCI. In addition, the signaling used to indicate to start the cellDTXDRX-inactivity Timer may also indicate the size of the started cellDTXDRX-inactivity Timer;
- a PDCCH for scheduling new data transmissions (new data transmissions including downlink, uplink and sidelink) is received; and/or
- a PDCCH for scheduling DL transmissions for multicast and broadcast service (MBS) is received, the PDCCH being scrambled via G-NRTI.

In one example, the network controls the state of the cell DTX/DRX via control (command) signaling, e.g., the network indicates the cell DTX/DRX to switch to an inactive time via control signaling, i.e., indicates the UE to stop the running cell DTX/DRX timer (including cellDTXDRX-onDurationTimer and cellDTXDRX-inactivity Timer), the control signaling can be carried via MAC CE or DCI. For example, assuming that the signaling is carried via the MAC CE, the DCI for scheduling the MAC CE may be scrambled using C-RNTI, or other RNTI values corresponding to multicast/broadcast transmissions, and at a pre-defined gap position after transmitting the HARQ feedback corresponding to the MAC CE, the UE stops the running cellDTXDRX-onDurationTimer and cellDTXDRX-inactivity Timer; or, assuming that the signaling is carried via the DCI, which may be a cell common DCI or a UE group DCI, which is scrambled by using a specific RNTI value, at a predetermined gap position after receiving the DCI, the UE stops the running cellDTXDRX-onDuration Timer and cellDTXDRX-inactivity Timer.

In one example, the cell DTX/DRX may be configured with two cycles, referred to as short and long cycles, and the cell DTX/DRX may switch between the short and long cycles, wherein the size of the long cycle is an integer multiple of the size of the short cycle, the long cycle DTX/DRX and the short cycle DTX/DRX use the same parameter to determine the starting position of the cycle and use the same parameter to determine the duration of the active time in the cycle, i.e., only the cycle size is different. The cell DTX/DRX can be flexibly switched between the long and short cycles to maximize the power savings.

For example, the base station may indicates the cell DTX/DRX to switch between long and short cycles via the MAC CE or DCI, e.g., the base station indicates the cell DTX/DRX via the MAC CE to use the long or short cycles, the DCI for scheduling the MAC CE may use a C-RNTI corresponding to a unicast transmission for scrambling, or the DCI for scheduling the MAC CE may be scrambled by using a RNTI corresponding to a multicast or broadcast transmission; or, the base station indicates the cell DTX/DRX to use the long or short cycles via the DCI, which may be a cell common DCI or a UE group DCI.

Figure 22:
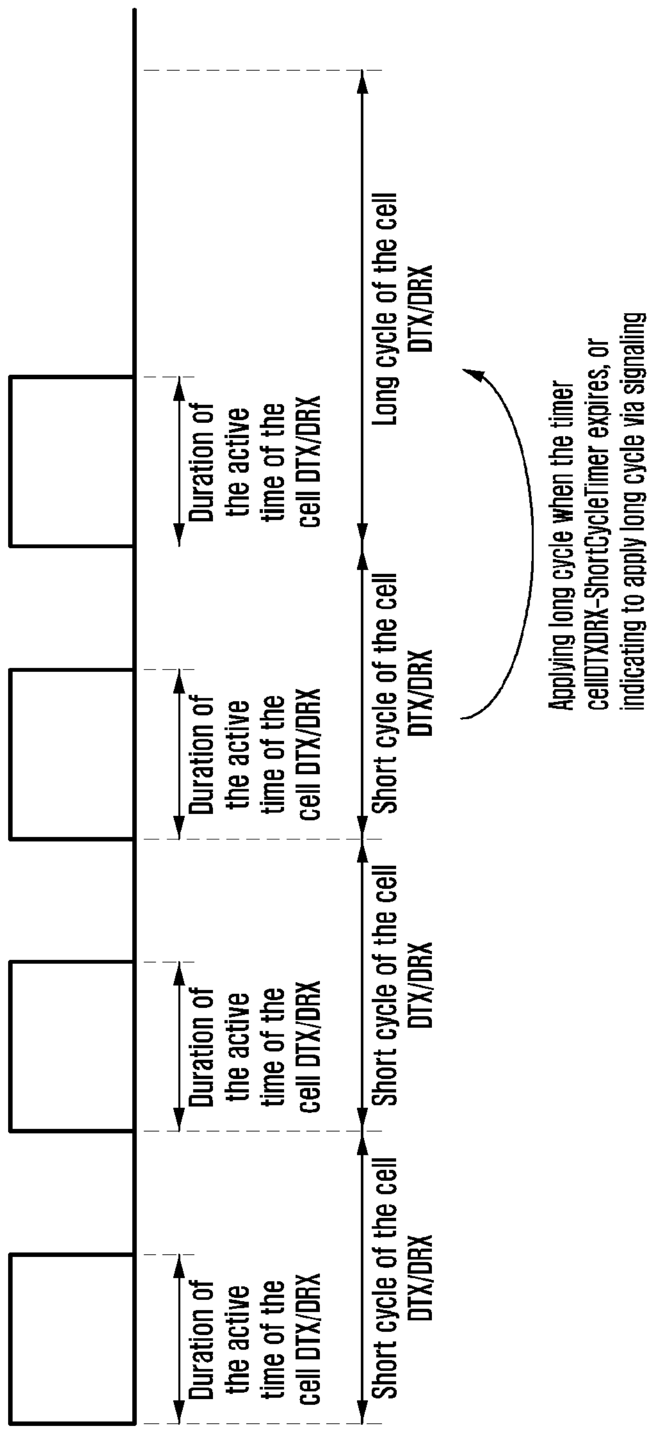
FIG. 22 illustrates an example of a cell DTX/DRX switching between short and long cycles according to an embodiment of the present disclosure.

In addition, the base station can also implicitly implement the cell DTX/DRX switching between the long and short cycles, as shown in FIG. 22, when the cell DTX/DRX is configured with both short and long cycles, the short cycle of the cell DTX/DRX is started first, and if the cell does not switch to the active time to serve any UE for N consecutive short cycles, then the cell DTX/DRX may switch to the long cycle, as long as the cell switches to the active time to serve UE in any long cycle, then the cell DTX/DRX may switch to the short cycle. In order to achieve the implicit switching, a timer cellDTXDRX-ShortCycleTimer can be defined to control the cell DTX/DRX to switch between the short cycle and long cycle by the timer. The timer cellDTXDRX-ShortCycleTimer can be started if some conditions are met, i.e., the cell DTX/DRX uses the short cycle and the cell DTX/DRX uses the long cycle if the timer cellDTXDRX-ShortCycleTimer expires. The conditions that trigger the timer cellDTXDRX-ShortCycleTimer to be started or restarted may be at least one of the following:

expiry of the timer cellDTXDRX-inactivityTimer as described previously; and/or signaling for indicating that the cell switches to the DRX inactive time is received, assuming DCI used by the signaling for scheduling the MAC CE may be scrambled by using a C-RNTI corresponding to a unicast transmission, or the DCI for scheduling the MAC CE may be scrambled by using a RNTI corresponding to a multicast or broadcast transmission.

In addition, if the UE receives signaling indicating that the cell switches to the DRX inactive time and applies a long cycle, the UE may perform at least one of the following:

stopping the timer cellDTXDRX-ShortCycleTimer; and/or applying the long cycle of the cell DTX/DRX.

In one example, a cell may be configured with parameters of a plurality of sets of cell DTX/DRX, parameters of each set of cell DTX/DRX including at least one of an independently configured cycle size, an offset parameter determining the starting position of the cycle, and the duration of the active time in the cycle. The network activates parameters of one of the sets of cell DTX/DRX based on real-time service conditions for flexible configuration purposes. For example, the network activates and de-activates one of the plurality of sets of cell DTX/DRX configuration parameters via the DCI, and the DCI carrying the activation/de-activation signaling may be a cell common DCI or a UE group DCI; or, the network activates and de-activates one of the plurality of sets of cell DTX/DRX configuration parameters via the MAC CE.

In one example, the UE determines that the cell DTX/DRX switches to an inactive time from an active time if at least one, or all, of the following conditions are met:

specific control signaling indication is received, the signaling is used to indicate that the cell DTX/DRX may end the active time, i.e., switch to the inactive time from the active time, the signaling may be carried via the MAC CE or DCI. For example, assuming that the signaling is carried via the MAC CE, the DCI for scheduling the MAC CE may be scrambled by using the C-RNTI, or other RNTI values corresponding to multicast/broadcast transmissions, and at a preset gap position after transmitting the HARQ feedback corresponding to the MAC CE, the UE acknowledges that the cell DTX/DRX has switched to the inactive time; or, assuming that the signaling is carried via the DCI, the DCI may be a cell common DCI or a UE group DCI, which is scrambled by using a specific RNTI value, and at a preset gap position after receiving the DCI, the UE acknowledges that the cell DTX/DRX switches to the inactive time.

None of the associated timers used to control the cell DTX/DRX are running, e.g., the duration timer cellDTXDRX-onDurationTimer, the inactivity timer cellDTXDRX-inactivity Timer as described below are not running.

no ongoing contention-based RACH process, i.e., no running timer ra-ContentionResolutionTimer or msgB-ResponseWindow;

no pending (pending) SR, and the SR has been transmitted via PUCCH; and/or no ongoing non-contention-based RACH process, i.e., the used random-access preamble is not selected from the contention-based random-access preamble.

In one example, when the DTX/DRX of a cell is considered to switch to an inactive time from an active time, the UE performs at least one of the following actions:

suspend or clear all configured downlink assignments on that cell, i.e., suspend or clear all configured semi-persistent scheduling PDSCHs (SPS-PDSCH);

suspend or clear all configured Type 1 uplink grant on that cell, i.e., suspend or clear all configured Type 1 configured Grant PUSCHs (CG-PUSCH);

suspend or clear the configured type 2 uplink grant on that cell, i.e., suspend or clear all configured type 2 CG-PUSCHs;

suspend or clear all PUSCH resources used for semi-persistent CSI report for that cell, including PUSCH resources configured on that cell and/or PUSCH resources configured on other cells;

clear all HARQ buffers on that cell;

de-activate all activated Bandwidth (BWP) on that cell;

stop the BWP inactivity timer bwp-Inactivity Timer on that cell;

cancel all triggered Consistent LBT failure processes on that cell;

cancel all triggered Beam failure recovery processes on that cell;

cancel all triggered RACH processes on that cell;

stop the running cell DTX/DRX timer associated with that cell, e.g., stopping the ongoing cell DTX/DRX duration timer cellDTXDRX-onDurationTimer, and/or the inactivity timer cellDTXDRX-inactivityTimer; and/or stop the running UE DRX timer associated with the cell, e.g., stopping the running UE DRX duration timer drx-onDurationTimer, inactivity timer drx-Inactivity Timer, downlink retransmission timer drx-RetransmissionTimerDL, uplink retransmission timer drx-RetransmissionTimerUL, downlink HARQ drx-HARQ-RTT-TimerDL, downlink HARQ drx-HARQ-RTT-TimerDL and/or at least one of them.

Here, suspending an SPS-PDSCH means that: the UE suspends reception of the activated SPS-PDSCH after the cell switches to the inactive time, but when the cell switches to the active time again, the UE may start receiving the SPS-PDSCH again, i.e., reinitialize the suspended SPS-PDSCH; clearing an SPS-PDSCH means that the: UE no longer receives the activated SPS-PDSCH after the cell switches to the inactive time regardless of whether the cell switches to the active time again later, that is, the corresponding PDSCH resources are cleared. In other words, the SPS-PDSCH is de-activated. For the "suspend" or "clear," the same meaning applies to Type 1 CG-PUSCH, Type 2 CG-PUSCH, and PUSCH resources for reporting semi-persistent CSI.

In one example, the UE determines that the cell DTX/DRX switches to the active time from the inactive time when at least one of the following conditions is met:

a timer for controlling the cell DTX/DRX is running, e.g., the duration timer cellDTXDRX-onDurationTimer or the inactivity timer cellDTXDRX-inactivityTimer as described below is running;

there are ongoing contention-based RACH processes, i.e., timer ra-ContentionResolutionTimer or msgB-ResponseWindow is running;

there is a pending SR, and the SR has been transmitted via PUCCH; and/or there are ongoing non-contention-based RACH processes, i.e., the used random-access preamble is not selected from the contention-based random-access preamble, and the random-access response RAR has been successfully received, but the PDCCH scrambled by using the C-RNTI and used to indicate the new data transmission has not been received.

In one example, when the DTX/DRX of a cell is considered to switch to an active time from an inactive time, the UE performs at least one of the following actions:

re-initialize the suspended downlink scheduling on that cell, i.e., re-initialize the suspended SPS-PDSCH;

reinitialize the suspended type 1 uplink authorization on this cell, i.e., reinitialize the suspended type 1 CG-PUSCH;

re-initialize the suspended type 2 uplink grant on that cell, i.e., re-initialize the suspended type 2 CG-PUSCH;

re-initialize the PUSCH resource corresponding to the suspended semi-persistent CSI report on that cell;

activate the late de-activated BWP;

activate a predefined or preconfigured BWP;

activate the BWP configured by the parameters initialDownlinkBWP, and/or initialUplinkBWP;

activate the BWP configured by the parameter defaultDownlinkBWP-Id;

activate the BWP configured by the parameters firstActiveDownlinkBWP-Id, and/or firstActiveUplinkBWP-Id;

start the BWP inactivity timer bwp-Inactivity Timer on that cell;

monitor the PDCCH based on a predefined or preconfigured search space group SSSG; and/or start the DTX/DRX inactivity timer cellDTXDRX-inactivityTimer associated with the cell.

In the above examples, the dynamic signaling for auxiliary control of the cell DTX/DRX state may be carried in a cell common DCI or a UE group DCI, e.g., an existing UE group DCI format 2-0 may be used to configure by high level signaling whether there is DCI field for auxiliary control of the cell DTX/DRX as described above in the existing DCI format 2-0. In addition, DCI format dedicated to cell DTX/DRX auxiliary control is defined, and the DCI format may include at least one indication field as follows:

1-bit indication field for indicating the start of cellDTXDRX-inactivity Timer;

1-to-2-bit indication field for indicating the size of the started cellDTXDRX-inactivity Timer, e.g., indicating one of 2 or 4 values preconfigured at a high level;

1-bit indication field for indicating the switching of the cell DTX/DRX from the active time to the inactive time;

1-bit indication field for indicating whether the cellDTX/DRX-onDurationTimer is started;

1-to-2-bit indication field for indicating the size of the started cell DTX/DRX-onDurationTimer, for example, indicating one of 2 or 4 values preconfigured at a high level;

1-bit indication field for indicating the cell DTX/DRX to apply the long or short cycle when both short and long cycles of the cell DTX/DRX are configured; and/or 1-to-2-bit indication field for indicating the index number of the applied cell DTX/DRX configuration, e.g., one of the 2 configurations or 4 configurations preconfigured at a high level by the index number.

Also provided in the embodiment of the present disclosure is a method performed by a base station in a communication system, the method including:

Step S201: transmitting semi-static configuration information related to a cell DTX and/or a cell DRX to a user equipment UE, and/or, transmitting dynamic adjustment signaling related to the cell DTX and/or the DRX to the UE, the semi-static configuration information and/or the dynamic adjustment signaling being used to indicate a state of the cell DTX and/or the cell DRX, wherein the state includes an active time or an inactive time; and/or Step S202: performing corresponding processing based on the state.

Optionally, the semi-static configuration information includes at least one of the following information:

a cycle of the cell DTX and/or the cell DRX;

a starting position of the cycle of the cell DTX and/or the cell DRX;

a duration of the active time in the cycle of the cell DTX and/or the cell DRX; and/or a duration of the inactive time in the cycle of the cell DTX and/or the cell DRX.

Optionally, the dynamic adjustment signaling includes at least one of following signaling:

first signaling for indicating whether the active time is started at the starting position of the cycle of the cell DTX and/or the DRX, and/or adjusting the duration of the active time;

second signaling for indicating that the cell DTX and/or DRX switches to the inactive time from the active time, or switches to the active time from the inactive time;

third signaling for indicating that the duration of the active time of the cell DTX and/or DRX is extended by a predetermined time length; and/or fourth signaling for indicating that the cell DTX and/or DRX is in the active time.

Optionally, if the first signaling is not detected, it is predefined or preconfigured, whether the active time is started at the starting position of the cycle of the corresponding cell DTX and/or cell DRX; and/or if the first signaling is detected, then whether the active time is started at the starting position of the cycle of the corresponding cell DTX and/or cell DRX is predefined or determined according to the indication of the first signaling.

Optionally, the third signaling is used to extend a semi-statically configured active duration, or an active duration which is dynamically extended by third signaling previously.

Optionally, the dynamic adjustment signaling is carried by at least one of the following:

a cell common DCI;

UE group DCI;

a physical signal sequence; and/or

MAC CE.

Optionally, transmitting the semi-static configuration information, including at least one of the following means:

transmitting the semi-static configuration information via a UE-specific RRC signaling; and/or transmitting the semi-static configuration information via the SIB.

Optionally, the semi-static configuration information includes at least one of the following:

a cycle of the cell DRX is equal to a cycle of the cell DTX;

a cycle of the cell DRX is an integer multiple of a cycle of the cell DTX;

a cycle of the cell DTX is an integer multiple of a cycle of the cell DRX;

a duration of the active time in the cycle of the cell DTX is greater than or equal to a duration of the active time in the cycle of the cell DRX; and/or a duration of the active time in the cycle of the cell DRX fully or partially overlaps with a duration of the active time in the cycle of the cell DTX.

Optionally, a duration of the active time in the cycle of the cell DRX partially overlaps with the duration of the active time in the cycle of the cell DTX, including at least one of the following scenarios:

the duration of the overlapping part is greater than or equal to a first predetermined threshold value; and/or the overlapping part includes the starting position of the active time in the cycle of the cell DRX.

Optionally, the semi-static configuration information includes at least one of the following scenarios:

a cycle of the cell DTX and/or the cell DRX is equal to a cycle of the UE DRX;

a cycle of the UE DRX is an integer multiple of a cycle of the cell DTX and/or the cell DRX;

a cycle of the cell DTX and/or the cell DRX is an integer multiple of a cycle of the UE DRX;

a duration of the active time in the cycle of the cell DTX and/or the cell DRX is greater than or equal to a duration of the active time in the cycle of the UE DRX; and/or a duration of the active time in the cycle of the cell DTX and/or the cell DRX fully or partially overlaps with a duration of the active time in the cycle of the UE DRX.

Optionally, the cell includes at least one of a secondary cell, a primary cell, and a primary secondary cell.

Optionally, the plurality of cells of the UE are configured with a cell DTX and/or a cell DRX, respectively; and/or the plurality of cells of the UE shares the same configuration of the cell DTX and/or cell DRX.

Optionally, the secondary cells of the UE are configured with the cell DTX and/or cell DRX, transmitting semi-static configuration information and/or dynamic adjustment signaling, including transmitting semi-static configuration information and/or dynamic adjustment signaling for the secondary cell on the primary cell of the UE.

Optionally, in the inactive time of the cell DTX, the base station behavior includes at least one of the following:

not transmitting a downlink signal;

not transmitting at least one of SSB, SIB1, OSI, Msg2, Msg4, MsgB, SPS-PDSCH, SPS-PDSCH retransmission; and/or not transmitting at least one of PDCCH on type 1 common search space, PDCCH on type 2 common search space, PDCCH on type 3 common search space, and PDCCH on a UE-specific search space.

Optionally, in the inactive time of the cell DRX, the UE behavior includes at least one of:

not receiving an uplink signal; and/or not receiving at least one of PRACH, MsgA, Msg3, CG-PUSCH, CG-PUSCH retransmission.

The method performed by the base station of each embodiment of the present disclosure corresponds to the method of each embodiment on the UE side, the detailed functional description of which and the resulting beneficial effects can be found specifically in the description of the corresponding method shown in the previous embodiments on the UE side and will not be repeated here.

Embodiments of the present disclosure provide a UE including: a transceiver configured to transmit and receive signals; and a processor coupled to the transceiver and configured to implement the steps of the respective method embodiment performed by the UE as described previously, the detailed functional description of which and the resulting beneficial effects can be found specifically in the description of the corresponding method embodiment performed by the UE as described previously and will not be repeated here.

Embodiments of the present disclosure provide a base station including: a transceiver configured to transmit and receive signals; and a processor coupled to the transceiver and configured to implement the steps of the method embodiments performed by the base station as described in the preceding method embodiments performed by the base station, the detailed functional description of which and the resulting beneficial effects can be found specifically in the description of the method embodiments performed by the base station as described previously and will not be repeated here.

Embodiments of the present disclosure provide an electronic device including a memory, a processor and a computer program stored on the memory, the processor executing the computer program to implement the steps of each of the preceding method embodiments. Optionally, the electronic device may refer to a UE, or the electronic device may refer to a base station.

Figure 19:
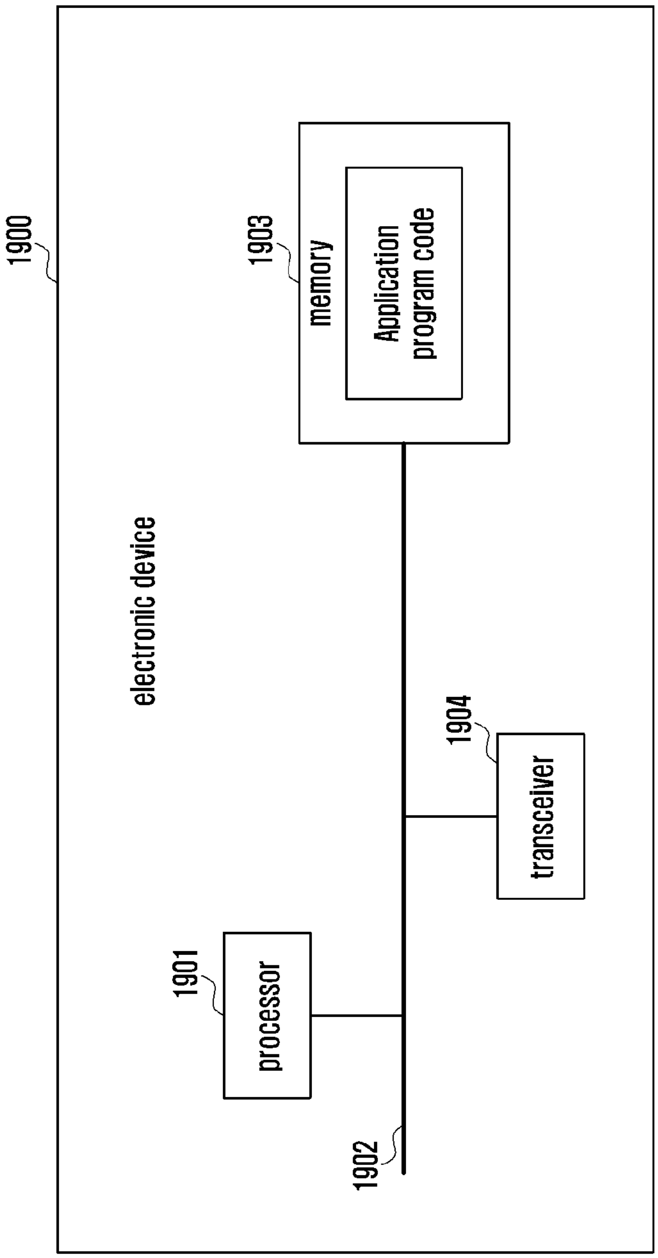
FIG. 19 illustrates an example of an electronic device according to an embodiment of the present disclosure.

In one example, there is provided an electronic device, as shown in FIG. 19, an electronic device 1900 illustrated in FIG. 19 includes a processor 1901 and a memory 1903. Wherein, the processor 1901 is connected to memory 1903, such as connected through a bus 1902. Optionally, the electronic device 1900 may further include a transceiver 1904, and the transceiver 1904 can be used for data interaction between the electronic device and other electronic devices, such as transmission of data and/or reception of data, and so on. It is to be noted that, in practical applications, the number of the transceiver 1904 is not limited to one, and the structure of the electronic device 1900 does not constitute any limitation to the embodiments of the present disclosure.

The processor 1901 may be a central processing unit (CPU), a general-purpose processor, a digital signal processor (DSP), an application specific integrated circuit (ASIC), and a field programmable gate array (FPGA), or other programmable logic device, transistor logic device, hardware component, or any combination thereof. It is possible to implement or execute the various exemplary logical blocks, modules and circuits described in combination with the disclosures of the present disclosure. The processor 1901 may also be a combination for realizing computing functions, for example, a combination of one or more microprocessors, a combination of DSPs and microprocessors, etc.

The bus 1902 can include a path for delivering information among the above components. The bus 1902 may be a peripheral component interconnect (PCI) bus, an extended industry standard architecture (EISA) bus, etc. The bus 1902 may be divided into an address bus, a data bus, a control bus, and so on. For ease of representation, the bus is represented by only one bold line in FIG. 19, but it does not mean that there is only one bus or one type of buses.

The memory 1903 may be, but not limited to, read only memories (ROMs) or other types of static storage devices capable of storing static information and instructions, random access memories (RAMs) or other types of dynamic storage devices capable of storing information and instructions, or electrically erasable programmable read only memories (EEPROMs), compact disc read only memories (CD-ROMs) or other optical disc storages, optical disc storages (including compact discs, laser discs, optical discs, digital versatile optical discs, Blue-ray discs, etc.), magnetic disc storage mediums or other magnetic storage devices, or any other medium that can be used to carry or store computer programs and can be accessed by a computer.

The memory 1903 is used to store computer programs for executing embodiments of the present disclosure and is controlled for execution by the processor 1901. The processor 1901 is configured to execute the computer program stored in the memory 1903 to implement the steps shown in the foregoing method embodiment.

Embodiments of the present disclosure provide a computer-readable storage medium having a computer program stored on the computer-readable storage medium, the computer program, when executed by a processor, implements the steps and corresponding contents of the foregoing method embodiments.

An embodiment of the present disclosure further provides a computer program product, including computer programs that, when executed by a processor, can implement the steps and corresponding contents in the above method embodiments.

The terms "first," "second," "third," "fourth," "1," "2," "3," "4," etc. (if present) in the specification and claims of the present disclosure and the accompanying drawings above are used to distinguish similar objects and need not be used to describe a particular order or sequence. It should be understood that the used data can be interchanged if appropriate, so that the embodiments of the present disclosure described herein can be implemented in an order other than the orders illustrated or described with text.

It should be understood that, although various operational steps are indicated by arrows in the flowcharts of embodiments of the present disclosure, the order in which the steps are performed is not limited to the order indicated by the arrows. Unless explicitly stated herein, in some implementation scenarios of embodiments of the present disclosure, the implementation steps in the respective flowcharts may be performed in other order as required. In addition, some or all of the steps in each flowchart may include multiple sub-steps or multiple stages based on actual implementation scenarios. Some or all of these sub-steps or phases may be executed at the same moment, and each of these sub-steps or phases may also be executed separately at different moments. The order of execution of these sub-steps or stages can be flexibly configured according to requirements in different scenarios of execution time, and the embodiments of the present disclosure are not limited thereto.

The above-mentioned description is merely an alternative embodiment for some implementation scenarios of the present disclosure, and it should be noted that it would have been within the scope of protection of embodiments of the present disclosure for those skilled in the art to adopt other similar implementation means based on the technical idea of the present disclosure without departing from the technical concept of the solution of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a communication system, the method comprising:

receiving first configuration information on discontinuous reception (DRX);

receiving second configuration information on a cell discontinuous transmission (DTX) and a cell DRX;

identifying first active time for the DRX and first inactive time for the DRX based on the first configuration information;

identifying second active time for the cell DTX and second inactive time for the cell DTX based on the second configuration information; and identifying third active time for the cell DRX and third inactive time for the cell DRX based on the second configuration information, wherein a physical downlink control channel (PDCCH) is not monitored in the first active time for the DRX and in the second inactive time for the cell DTX;

wherein the second active time and the third active time are partially overlapped; and wherein at least one of the following is satisfied:

a duration of an overlapped part of the second active time and the third active time is greater than or equal to a first predetermined threshold; or the overlapped part includes a starting position of the third active time in a cycle of the cell DRX.

2. The method of claim 1, wherein the second configuration information includes a cycle of the cell DTX, a starting position of the cycle of the cell DTX, a duration of the second active time, the cycle of the cell DRX, a starting position of the cycle of the cell DRX and a duration of the third active time.

3. The method of claim 1, wherein the PDCCH is not monitored in the first inactive time for the DRX and in the second inactive time for the cell DTX.

4. The method of claim 1, wherein a semi-persistent scheduled physical downlink shared channel (SPS-PDSCH) is not received in the second inactive time for the cell DTX, and wherein a configured grant physical uplink shared channel (CG-PUSCH) is not transmitted and not retransmitted in the third inactive time for the cell DRX.

5. A user equipment (UE) comprising:

at least one transceiver; and at least one processor coupled with the at least one transceiver and configured to:

receive first configuration information on discontinuous reception (DRX);

receive second configuration information on a cell discontinuous transmission (DTX) and a cell DRX;

identify first active time for the DRX and first inactive time for the DRX based on the first configuration information;

identify second active time for the cell DTX and second inactive time for the cell DTX based on the second configuration information; and identify third active time for the cell DRX and third inactive time for the cell DRX based on the second configuration information, wherein a physical downlink control channel (PDCCH) is not monitored in the first active time for the DRX and in the second inactive time for the cell DTX;

wherein the second active time and the third active time are partially overlapped; and wherein at least one of the following is satisfied:

a duration of an overlapped part of the second active time and the third active time is greater than or equal to a first predetermined threshold; or the overlapped part includes a starting position of the third active time in a cycle of the cell DRX.

6. The UE of claim 5, wherein the second configuration information includes a cycle of the cell DTX, a starting position of the cycle of the cell DTX, a duration of the second active time, the cycle of the cell DRX, a starting position of the cycle of the cell DRX and a duration of the third active time.

7. The UE of claim 5, wherein the PDCCH is not monitored in the first inactive time for the DRX and in the second inactive time for the cell DTX.

8. The UE of claim 5, wherein a semi-persistent scheduled physical downlink shared channel (SPS-PDSCH) is not received in the second inactive time for the cell DTX, and wherein a configured grant physical uplink shared channel (CG-PUSCH) is not transmitted and not retransmitted in the third inactive time for the cell DRX.

9. A method performed by a base station (BS) in a communication system, the method comprising:

determining first active time for discontinuous reception (DRX) and first inactive time for the DRX;

determining second active time for a cell discontinuous transmission (DTX) and second inactive time for the cell DTX;

determining third active time for a cell DRX and third inactive time for the cell DRX;

transmitting first configuration information associated with the DRX; and transmitting second configuration information associated with the cell DTX and the cell DRX, wherein a physical downlink control channel (PDCCH) is not transmitted in the first active time for the DRX and in the second inactive time for the cell DTX;

wherein the second active time and the third active time are partially overlapped; and wherein at least one of the following is satisfied:

a duration of an overlapped part of the second active time and the third active time is greater than or equal to a first predetermined threshold; or the overlapped part includes a starting position of the third active time in a cycle of the cell DRX.

10. The method of claim 9, wherein the PDCCH is not transmitted in the first inactive time for the DRX and in the second inactive time for the cell DTX.

11. The method of claim 9, wherein a semi-persistent scheduled physical downlink shared channel (SPS-PDSCH) is not transmitted in the second inactive time for the cell DTX, and wherein a configured grant physical uplink shared channel (CG-PUSCH) is not received and not re-received in the third inactive time for the cell DRX.

12. The method of claim 9, wherein the second configuration information includes a cycle of the cell DTX, a starting position of the cycle of the cell DTX, a duration of the second active time, the cycle of the cell DRX, a starting position of the cycle of the cell DRX and a duration of the third active time.

13. A base station (BS) comprising:

at least one transceiver; and at least one processor coupled with the at least one transceiver and configured to:

determine first active time for discontinuous reception (DRX) and first inactive time for the DRX;

determine second active time for a cell discontinuous transmission (DTX) and second inactive time for the cell DTX;

determine third active time for a cell DRX and third inactive time for the cell DRX;

transmit first configuration information associated with the DRX; and transmit second configuration information associated with the cell DTX and the cell DRX, wherein a physical downlink control channel (PDCCH) is not transmitted in the first active time for the DRX and in the second inactive time for the cell DTX;

wherein the second active time and the third active time are partially overlapped; and wherein at least one of the following is satisfied:

a duration of an overlapped part of the second active time and the third active time is greater than or equal to a first predetermined threshold; or the overlapped part includes a starting position of the third active time in a cycle of the cell DRX.

14. The BS of claim 13, wherein the PDCCH is not transmitted in the first inactive time for the DRX and in the second inactive time for the cell DTX.

15. The BS of claim 13, wherein a semi-persistent scheduled physical downlink shared channel (SPS-PDSCH) is not transmitted in the second inactive time for the cell DTX, and wherein a configured grant physical uplink shared channel (CG-PUSCH) is not received and not re-received in the third inactive time for the cell DRX.

16. The BS of claim 13, wherein the second configuration information includes a cycle of the cell DTX, a starting position of the cycle of the cell DTX, a duration of the second active time, the cycle of the cell DRX, a starting position of the cycle of the cell DRX and a duration of the third active time.

* * * * *